(12) United States Patent
Goldman et al.

(10) Patent No.: US 12,322,776 B2
(45) Date of Patent: Jun. 3, 2025

(54) MODULAR BATTERY SYSTEM

(71) Applicant: Lunar Energy, Inc., Mountain View, CA (US)

(72) Inventors: Mark Daniel Goldman, Los Altos Hills, CA (US); Kevin Richard Fine, Redwood City, CA (US); Tanner Bruce DeVoe, Fremont, CA (US); Ian Gregory Spearing, Westerville, OH (US); Conrad Xavier Murphy, San Francisco, CA (US); Erica Viola Lewis, Portland, OR (US); Tahina Christine Felisca, Redwood City, CA (US); Bozhi Yang, Santa Clara, CA (US); Mark Holveck, Sunnyvale, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/544,784

(22) Filed: Dec. 7, 2021

(65) Prior Publication Data

US 2023/0083678 A1 Mar. 16, 2023

Related U.S. Application Data

(60) Provisional application No. 63/245,004, filed on Sep. 16, 2021.

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/63* (2015.04); *H01M 10/647* (2015.04); *H01M 10/6556* (2015.04); *H01M 10/6563* (2015.04); *H01M 10/658* (2015.04); *H01M 10/667* (2015.04); *H01M 50/211* (2021.01); *H01M 50/233* (2021.01);
(Continued)

(58) Field of Classification Search
None
See application file for complete search history.

(56) References Cited

U.S. PATENT DOCUMENTS

| 6,407,533 B1 | 6/2002 | Bartek |
| 10,424,923 B2 | 9/2019 | Ozbek |

(Continued)

FOREIGN PATENT DOCUMENTS

| CN | 104044479 | 11/2017 |
| CN | 106532178 | 5/2019 |

(Continued)

OTHER PUBLICATIONS

Lakshmy Nair, Add an Oscillating Fan to a Room: 8 Advantages, Aug. 9, 2009, DoItYourself (Year: 2009).*

*Primary Examiner* — Ula C Ruddock
*Assistant Examiner* — Mary Grace Byram
(74) *Attorney, Agent, or Firm* — Van Pelt, Yi & James LLP

(57) ABSTRACT

An energy storage assembly includes a vertical stack of substantially planar modules. Each module comprises a plurality of energy storage components and a thermally conductive shell comprising a shell top, a shell bottom, shell sides, a shell front, and a shell rear.

23 Claims, 27 Drawing Sheets

(51) Int. Cl.
*H01M 10/63* (2014.01)
*H01M 10/647* (2014.01)
*H01M 10/6556* (2014.01)
*H01M 10/6563* (2014.01)
*H01M 10/658* (2014.01)
*H01M 10/667* (2014.01)
*H01M 50/211* (2021.01)
*H01M 50/233* (2021.01)
*H01M 50/342* (2021.01)
*H02J 7/00* (2006.01)

(52) U.S. Cl.
CPC ....... *H01M 50/3425* (2021.01); *H02J 7/0042* (2013.01); *H02J 7/0045* (2013.01); *H02J 7/00309* (2020.01); *H02J 7/0048* (2020.01); *H02J 7/005* (2020.01)

(56) References Cited

U.S. PATENT DOCUMENTS

| | | |
|---|---|---|
| 2002/0168556 A1 | 11/2002 | Leboe |
| 2007/0053162 A1* | 3/2007 | Keenan .............. H05K 7/20572 |
| | | 361/700 |
| 2008/0295535 A1 | 12/2008 | Robinet |
| 2010/0083647 A1* | 4/2010 | Dickinson ............. F01N 13/082 |
| | | 60/324 |
| 2011/0308831 A1* | 12/2011 | Martinsson ......... H01M 50/213 |
| | | 173/217 |
| 2012/0003510 A1 | 1/2012 | Eisenhour |
| 2012/0313559 A1* | 12/2012 | Tonomura ............. H01M 50/20 |
| | | 307/29 |
| 2013/0252033 A1* | 9/2013 | Bocek ................. H01M 10/425 |
| | | 429/7 |
| 2014/0262568 A1* | 9/2014 | Matsuda .................. B62J 43/20 |
| | | 180/65.1 |
| 2014/0356684 A1* | 12/2014 | Lim .................. H01M 10/6556 |
| | | 429/120 |
| 2016/0036023 A1* | 2/2016 | DeKeuster ............ H01M 50/30 |
| | | 429/53 |
| 2016/0226034 A1* | 8/2016 | Seok .................... H01M 50/209 |
| 2017/0136864 A1* | 5/2017 | Ito ...................... H01M 10/6563 |
| 2017/0214008 A9 | 7/2017 | Mardall |
| 2017/0290204 A1* | 10/2017 | Cragnotti ................ B60L 50/64 |
| 2018/0090949 A1* | 3/2018 | Lim .................... H01M 10/625 |
| 2018/0123357 A1* | 5/2018 | Beaston .................. H02J 3/381 |
| 2020/0009968 A1 | 1/2020 | Lewis |
| 2020/0144580 A1* | 5/2020 | Hong ................. H01M 10/4257 |
| 2020/0161721 A1* | 5/2020 | Wang ................. H01M 10/6567 |
| 2020/0194819 A1* | 6/2020 | Aikata .................. H01M 50/54 |
| 2020/0313255 A1 | 10/2020 | Wu |
| 2020/0338959 A1 | 10/2020 | Carlson |
| 2021/0276454 A1 | 9/2021 | Akutsu |
| 2021/0408618 A1* | 12/2021 | Soto .................... H01M 10/425 |

FOREIGN PATENT DOCUMENTS

| | | |
|---|---|---|
| CN | 111342168 | 6/2020 |
| CN | 109599616 | 12/2020 |
| CN | 109599605 | 1/2021 |
| JP | 2021016250 | 2/2021 |
| WO | 2020108532 | 6/2020 |
| WO | 2021150156 | 7/2021 |

\* cited by examiner

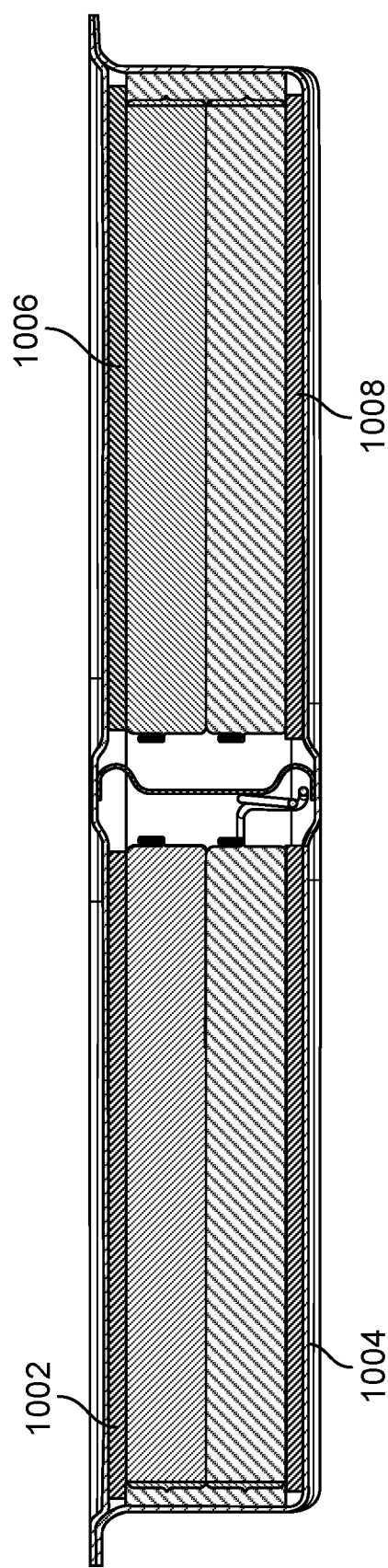

MODULAR BATTERY SYSTEM

CROSS REFERENCE TO OTHER APPLICATIONS

This application claims priority to U.S. Provisional Patent Application No. 63/245,004 entitled MODULAR ENERGY STORAGE SYSTEM filed Sep. 16, 2021 which is incorporated herein by reference for all purposes.

BACKGROUND OF THE INVENTION

Energy storage systems are complex, where various considerations must be taken into account when designing an energy storage system, from safety considerations due to the risk of fire, to on-site installation of battery systems. Thus, the design of energy storage systems can be challenging.

BRIEF DESCRIPTION OF THE DRAWINGS

Various embodiments of the invention are disclosed in the following detailed description and the accompanying drawings.

FIG. 10A illustrates an embodiment of a battery module.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
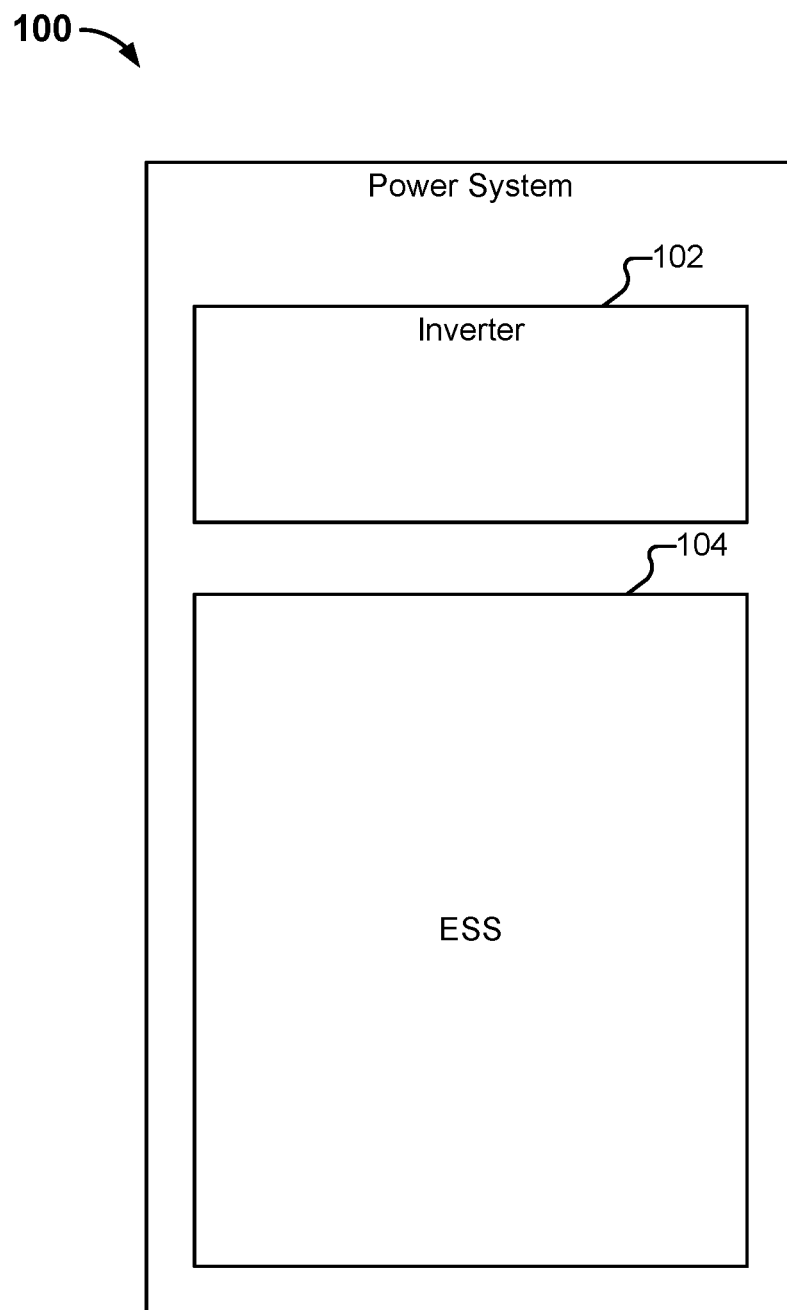
FIG. 1 illustrates an embodiment of a power system.
Figure 13:
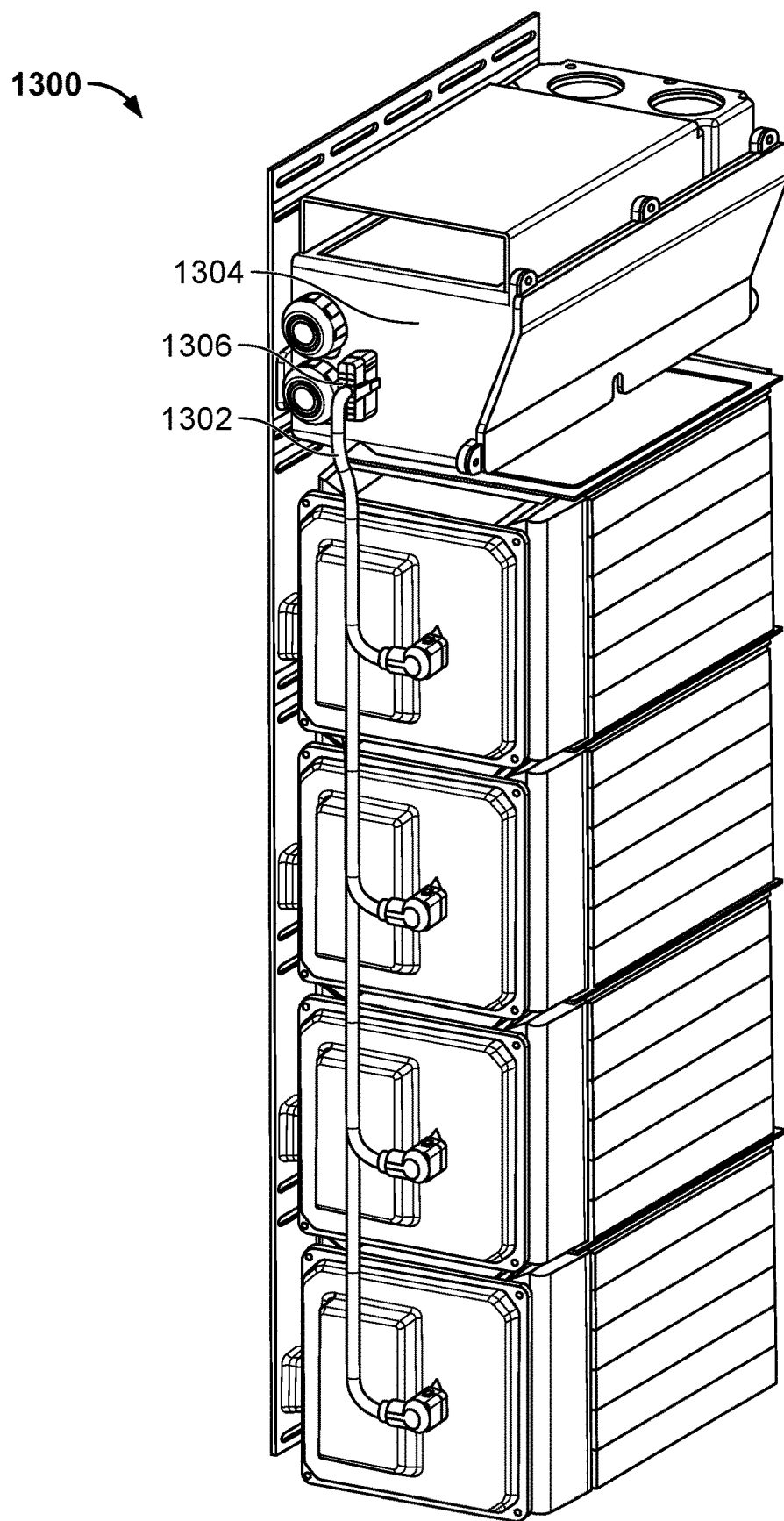
FIG. 13 illustrates an embodiment of a power system.

FIG. 1 illustrates an embodiment of a power system. In this example, the power system 100 includes an inverter (102). The power system also includes an energy storage system (ESS) 104. In this example, ESS 104 is a battery storage system. In other embodiments, the energy storage system is implemented using other forms of energy storage, such as fuel cells. In some embodiments, the energy storage system is a modular system that includes a stack of battery blocks (also referred to herein as battery assemblies) that are connected to inverter 102. Each battery block further includes a stack of battery modules that are connected together. Further details regarding a modular battery storage system, such as embodiments of electrical and thermal operation of the modular battery storage system are described below. An example of a power system including a stack of battery blocks connected to an inverter is shown in FIG. 13.

Battery Block

Figure 2:
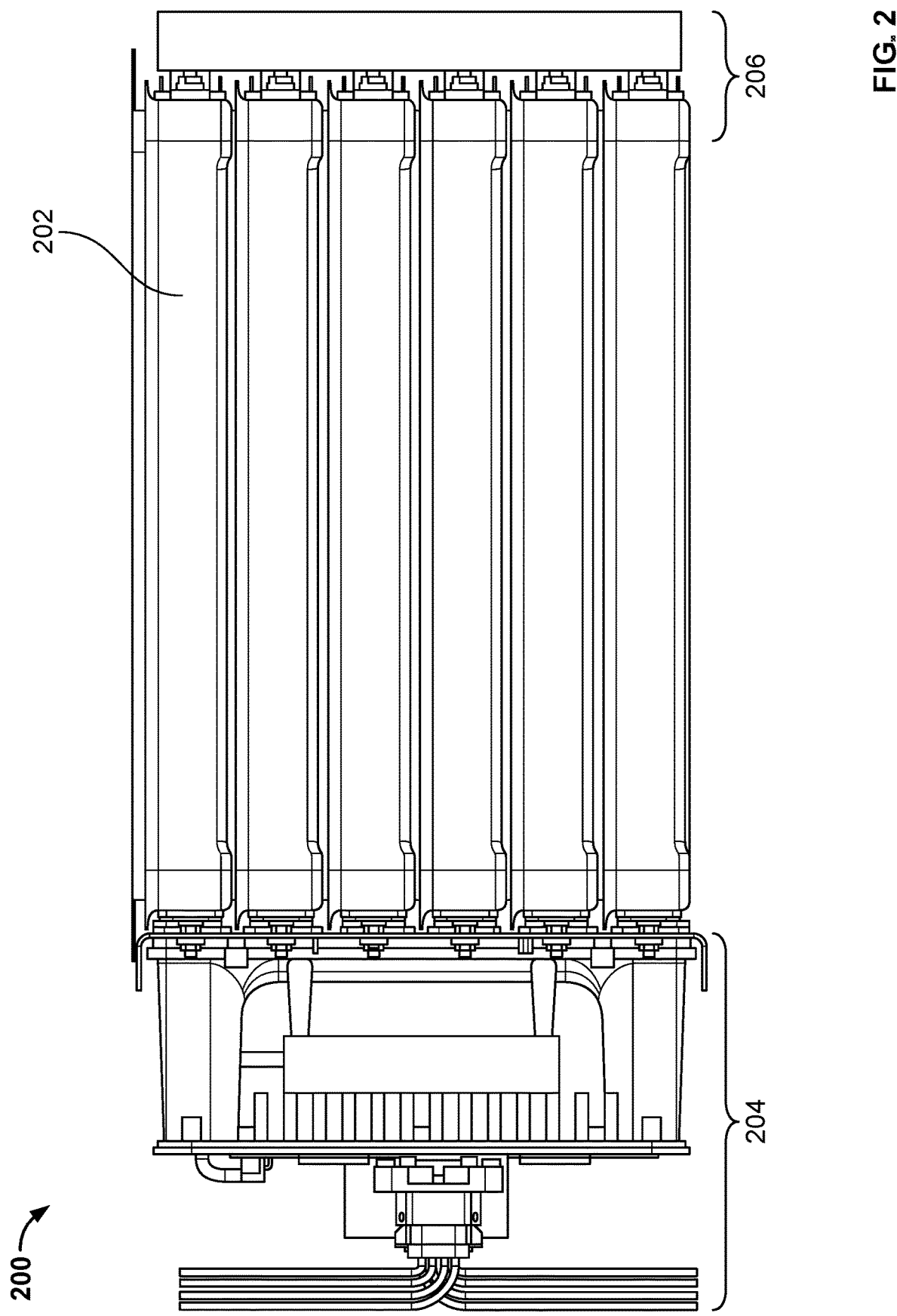
FIG. 2 illustrates an embodiment of a battery block.

FIG. 2 illustrates an embodiment of a battery block. In some embodiments, battery block 200 is an example of a battery block in a stack of battery blocks included in an energy storage system such as ESS 104 of FIG. 1.

In this example, the battery block includes a stack of battery modules, such as battery module 202. The battery modules are connected together. As will be described in further detail below, each battery module includes a set of energy storage components such as battery cells (e.g., as battery cell pouches), fuel cells, etc. For illustrative purposes, embodiments of battery modules including battery cells are described below. While a battery block including six battery modules is described herein for illustrative purposes, a battery block may include any number of battery modules, as appropriate. Further details regarding battery modules are described below.

When viewing the battery block of FIG. 2, the left side 204 of the battery block is referred to herein as the "front" or "terminal end" of the battery block, and houses various electrical components of the battery block, as will be described in further detail below. The right side 206 of the battery block is referred to herein as the "rear" or "exhaust end" of the battery block.

The following are embodiments of the electrical and thermal design of a battery block.

Battery Block Electrical Design

Figure 3:
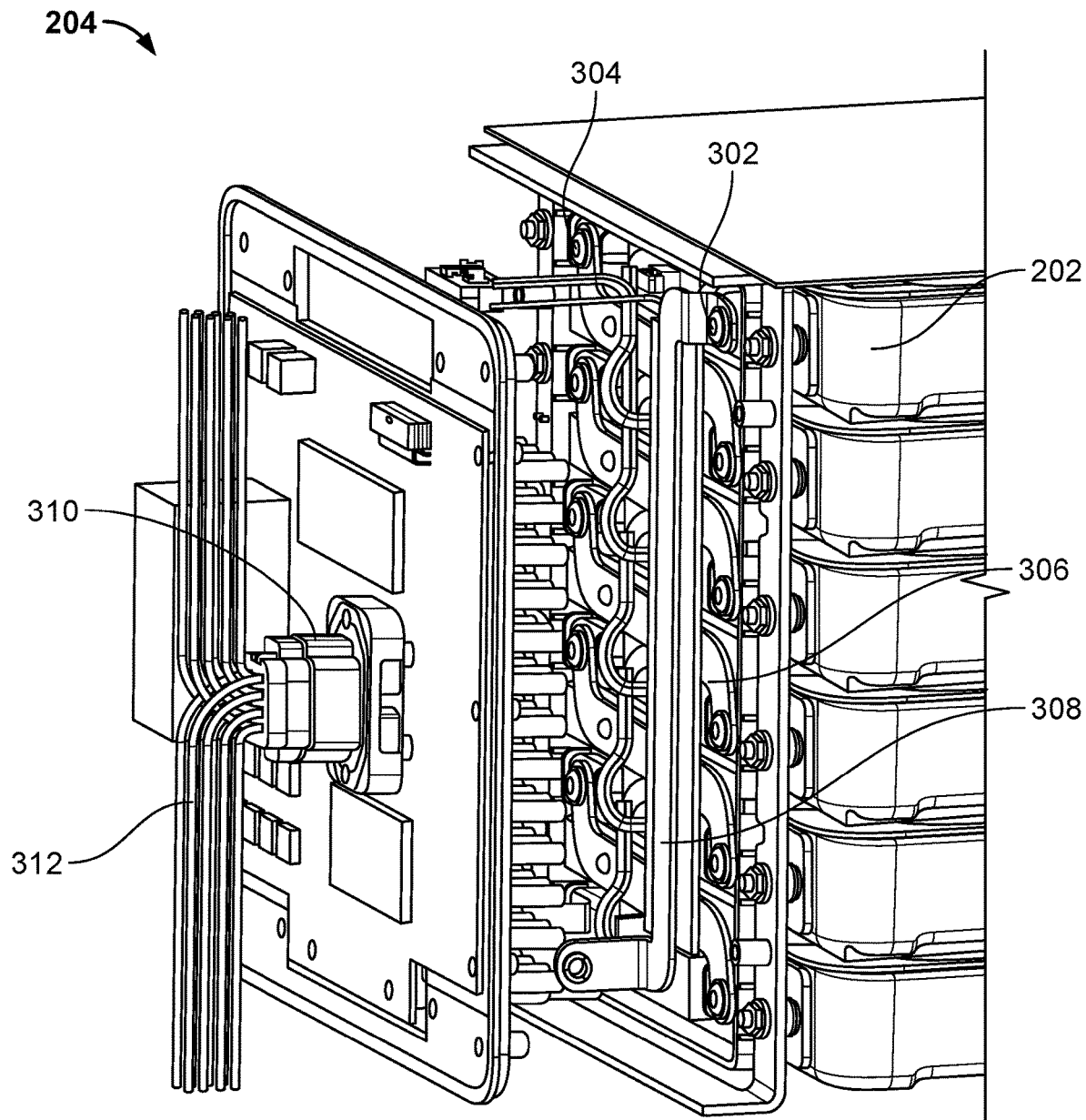
FIG. 3 illustrates an embodiment of an electrical layout of a battery block.

FIG. 3 illustrates an embodiment of an electrical layout of a battery block. In this example, a perspective view of portion 204 of battery block 200 of FIG. 2 is shown. As described above, in some embodiments, a battery block includes a stack of connected battery modules.

As shown in this example, and as will be described in further detail below, each module includes two electrical terminals/electrodes. Both electrodes are on the same face of the module. In some embodiments, and as will be described in further detail below, the cells within a module are connected in series in a manner to form a U-shape so that the anode and cathode can be on the same side of the module (rather than, for example, on opposing sides). Electrodes 302 and 304 are examples of the electrodes for module 202.

In this example, the battery modules are stacked in series by using s-shaped busbars (module-to-module busbars) such as s-shaped busbar 306. Here, the busbar between one module to the next connects an anode of one module to the cathode of another module, or the cathode of one module to the anode of another module. An overall stack/block busbar 308 then brings the top module back down to give the full stack voltage into the DC-DC converter 310.

The electrical series connection of the battery modules as shown in the example of FIG. 3 allows the addition of the voltages of the individual battery modules. As one example, each module operates at 8.4V. Here, the battery block includes six modules/cans. This results in the battery block operating at a voltage of approximately 50 volts (8.4Vx6).

As described above, the stack of series-connected modules are connected, via 302 to a DC-DC converter 310, which then feeds the stacked voltages up to an inverter (e.g., inverter 102 of FIG. 1). In some embodiments, the DC-DC converter boosts the voltage, for example, from 50V to 200V. The DC-DC converter may also be a buck converter that reduces the input voltage, or be a buck-boost converter that operates in either buck or boost mode.

Shown in this example portion of the battery block is a portion or segment 312 of a wiring harness that plugs into the DC-DC converter. As described above, a battery storage system may include a stack of battery blocks. For example, each battery block may have a capacity of 5 kWh, where a stack of three battery blocks results in a battery storage system with a capacity of 15 kWh.

In this example, plug 312 and associated wiring is a portion or segment of a wiring harness that connects one battery block to another, ultimately connecting to the inverter. In some embodiments, the wiring harness carries both power and signal from the blocks to the inverter. For example, a portion of the wires of the harness are used for communication among the inverter and battery modules. Another set of wires are used to carry high voltage output from the DC-DC converters. In some embodiments, the wiring harness is touch-safe. In some embodiments, the harness is adjustable, and segments can be added or removed depending on the number of battery blocks to be connected (e.g., the harness is a segment-style harness that is extendable to accommodate more blocks that are added). In other embodiments, each configuration of battery blocks has its own corresponding one-piece harness. That is, there is one harness for each setup configuration (e.g., one harness for a three block system, another harness for a six block system, etc.). Further details regarding the wiring harness are described below.

Battery Block Thermal Design

The battery block is designed to provide thermal management in various modes, such as normal operation or in the event of thermal events.

Normal Operation Thermal Behavior

Figure 4A:
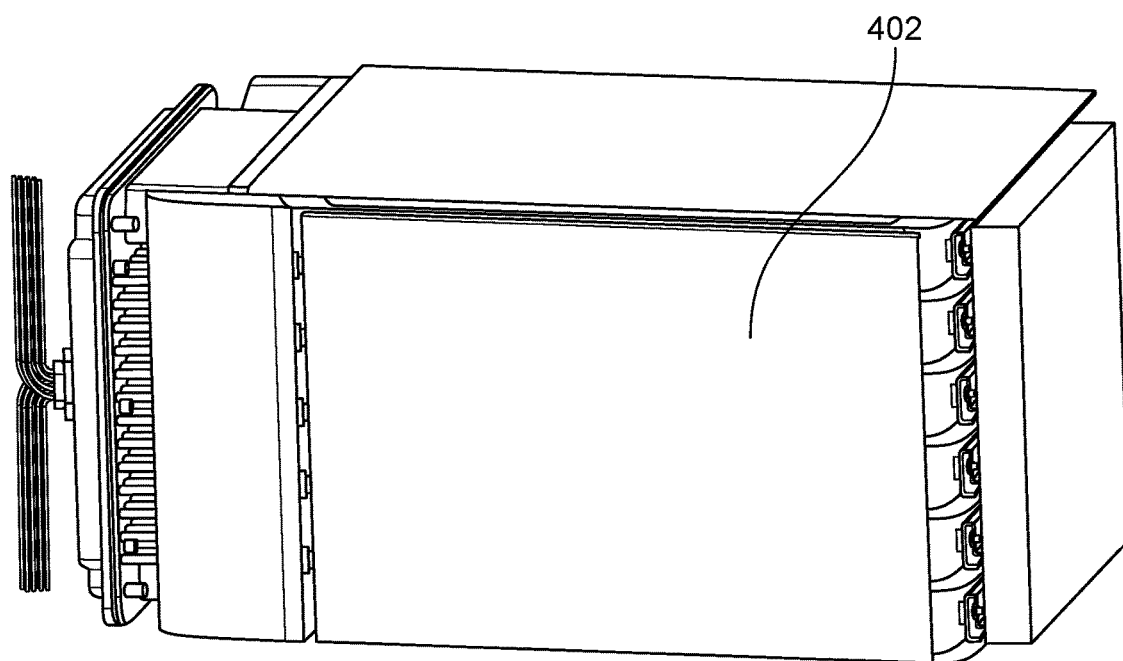
FIG. 4A illustrates an embodiment of a battery block.
Figure 4B:
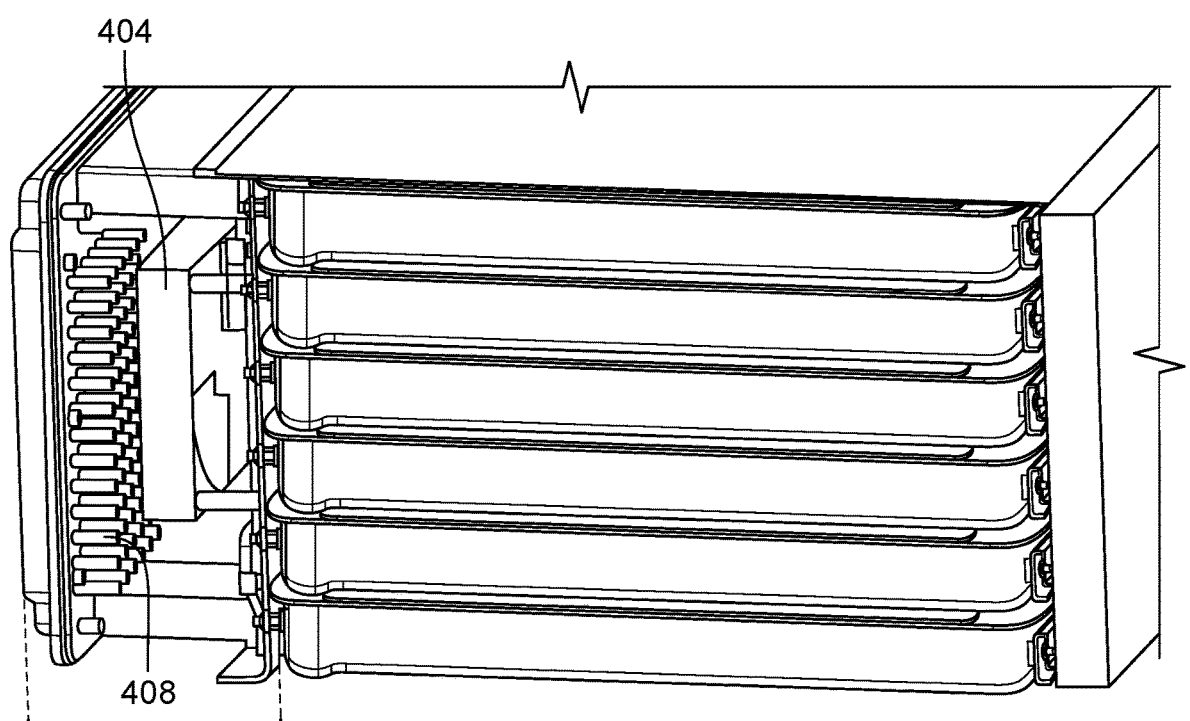
FIG. 4B illustrates an embodiment of a battery block.

The following are examples and embodiments of cooling and airflow of the battery stack during normal operation FIGS. 4A and 4B illustrate embodiments of a battery block. As shown in this example, during normal operation, air is pulled into a duct or channel formed by the long sides of the battery modules in the battery block and an outer cosmetic shroud 402 covering the battery modules that includes vents or ducts. The air flow is caused by and directed through the channel by fan 404. While a single fan is shown in this example for illustrative purposes, in other embodiments, multiple smaller fans may also be used. As one example, six smaller fans may be used, where there is one fan for each module in the battery block. For example, multiple smaller fans connected in parallel or in series may be used. While a fan is shown in this example for illustrative purposes, any other air/fluid circulator may be used as applicable.

As shown in this example, the shroud covers the battery modules, but does not seal the modules. The shroud has ducts to allow air to come in and out of the battery stack. The air that is drawn through the channel along the sides of the battery modules carries away heat generated by the battery cells, cooling the modules down. The heated air is then further cooled using, for example, a heat sink such as heat sink 408 of portion 406 of the battery stack.

Figure 4C:
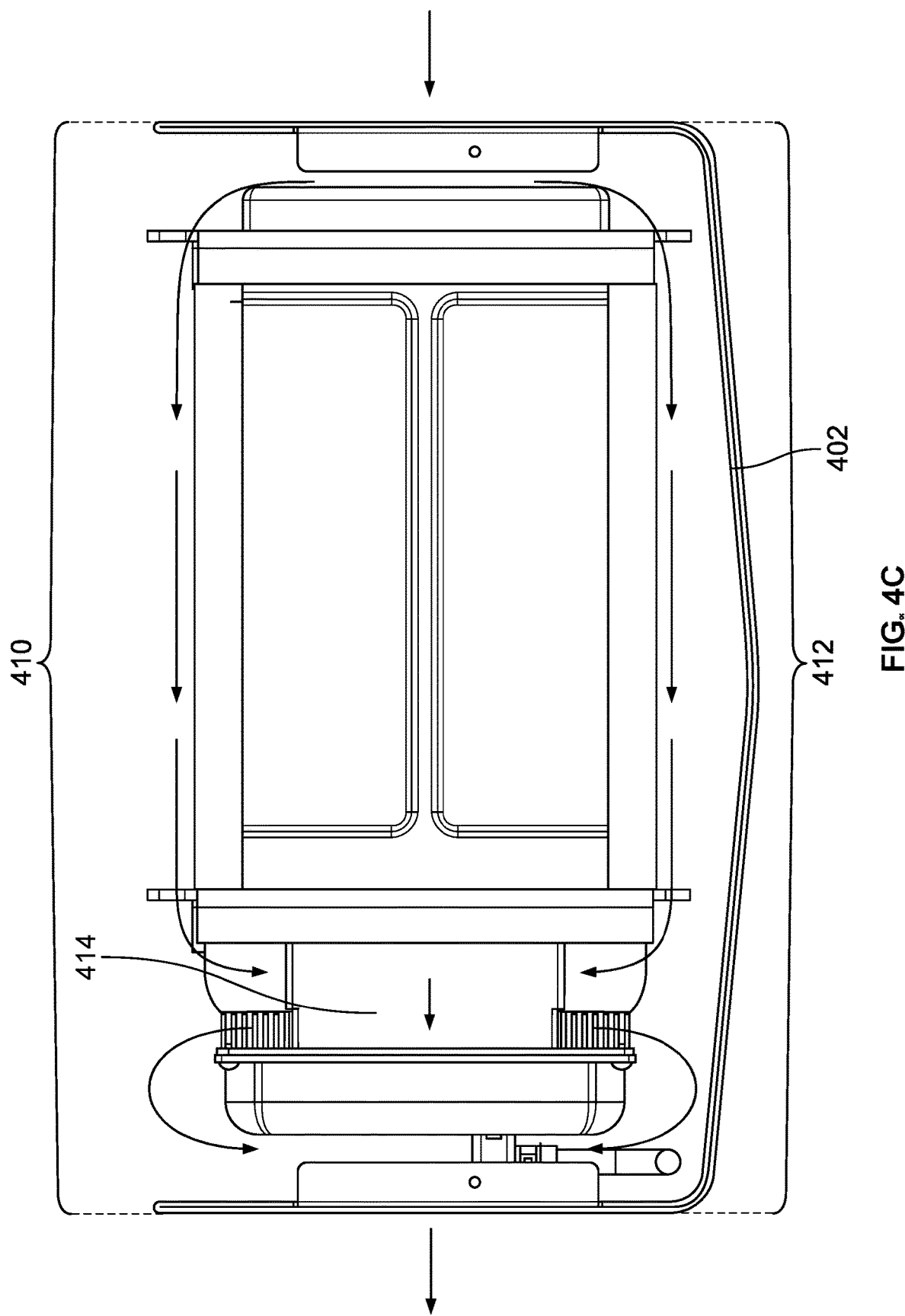
FIG. 4C illustrates an embodiment of air flow in a battery block to facilitate cooling.

FIG. 4C illustrate an embodiment of air flow in a battery block to facilitate cooling. In this example, a top down view of the battery block of FIG. 4B is shown. In this example, the fan 404 (under a manifold/duct 414 in the example of FIG. 4C) draws in air from a port on the right side of the cover 402 over the battery block (where the port on the right side is the inlet for this direction of airflow). The air then splits around the battery modules, where a portion of the air will go around the back side (410) of the module (on the side near the wall), where the other half of the air will flow around the front side (412) of the module. This flowing of air cools the six battery modules in the battery block. Once past the battery modules, the split air flows will both then flow into a duct (414) and merge when going through the fan. The duct acts as a manifold in which the six air channels on each side of the battery block flow into the fluid volume at the location of the fan. That is, the manifold aggregates the air branches and directs the merged air through the fan, which is the air driver/mover. The merged air is then pushed by the fan over the heat sink, where in some embodiments, the power electronics are mounted on the heat sink, thereby cooling the power electronics. The air is then split around the heat sink, before it merges again and exits out of the port/opening on the left side of the battery block (exhaust in this direction of airflow). In this example, although the ambient air may be warmed to some extent by the battery cells, because the cells operate with high efficiency, the cells generate little waste heat during normal operations. Thus, the air, even after passing over the battery modules, is still usable to cool the power electronics.

As will be described in further detail below, in some embodiments, the fan is bi-directional, and the direction of the fan may be reversed to facilitate warming of the battery cells, as well as temperature regulation.

Figure 5:
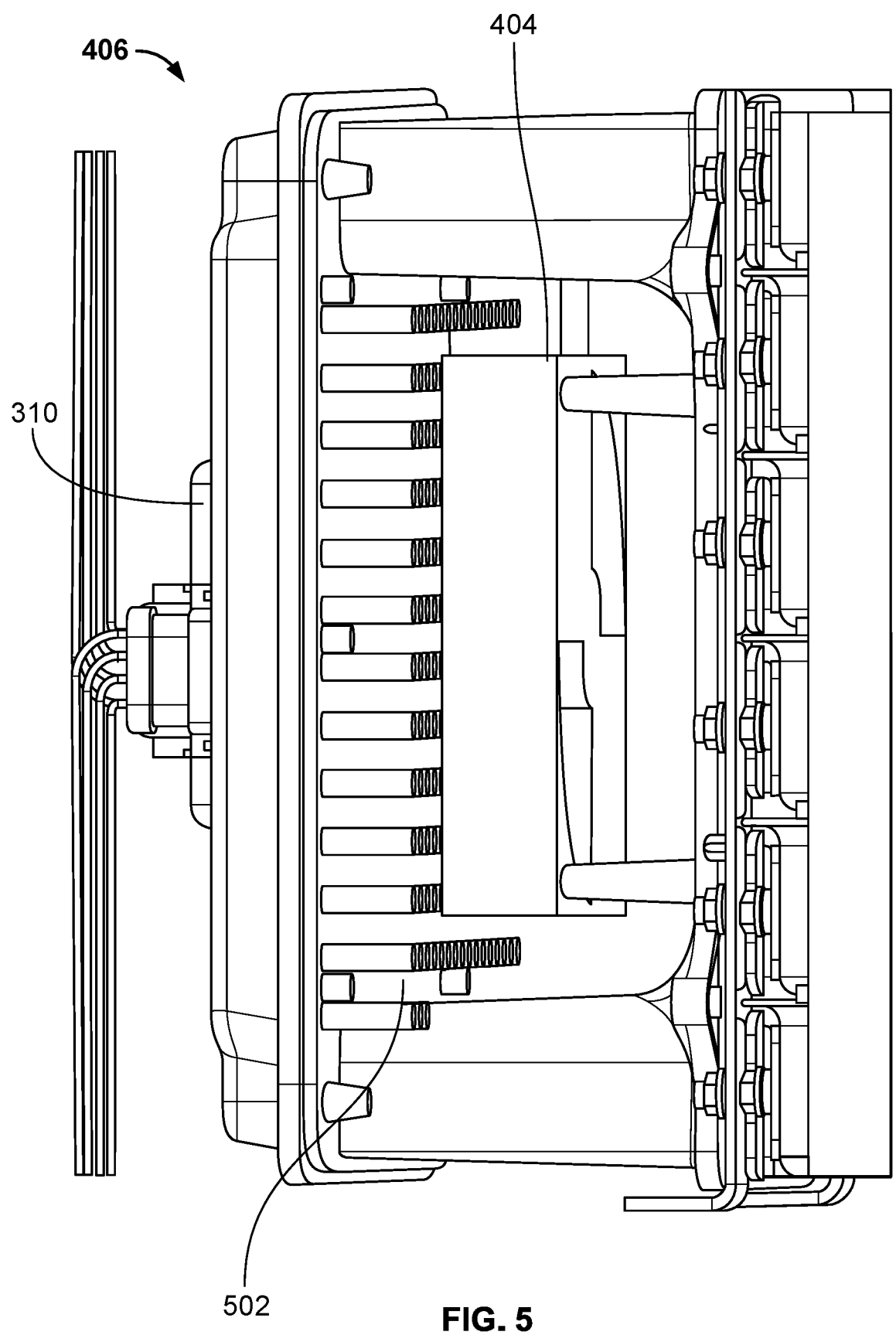
FIG. 5 illustrates an embodiment of a cooling structure of a battery block.

FIG. 5 illustrates an embodiment of a cooling structure of a battery block. In this example, a profile view of portion 406 of the battery block of FIG. 4B is shown. In this example, the fan 404 draws air from the right side of the modules of the battery block (as oriented in the examples of FIGS. 4A and 4B), where it is fed into ductwork and into the fan and then out through heatsink 502 (an example of heat sink 408 of FIG. 4B), which in some embodiments also cools the DC-DC converter 310. In this example, the heatsink is implemented using pin fins. Other types of heat sinks may be used, as appropriate.

Thus, as shown in this example, in normal operation, ambient air is run across the long sides of the modules to cool the modules down. As will be described in further detail below, the long sides of the modules may be made using a thermally conductive material such as coated steel to allow efficient transfer of heat.

Thermal Event Behavior

Thermal runaway events may occur in battery cells, where a battery cell catches fire. As will be described in further detail below, in some embodiments, each battery module is designed to mitigate the impact of thermal runaway events, for example, by including vents that are used to exhaust gases from within the module in case of thermal runaway. Described herein are techniques for exhausting such gases in a manner that is controlled and also allows for the exhaust gases to be cooled. This prevents the exhaust gases from causing other objects near the battery stack/storage system to ignite.

Figure 6:
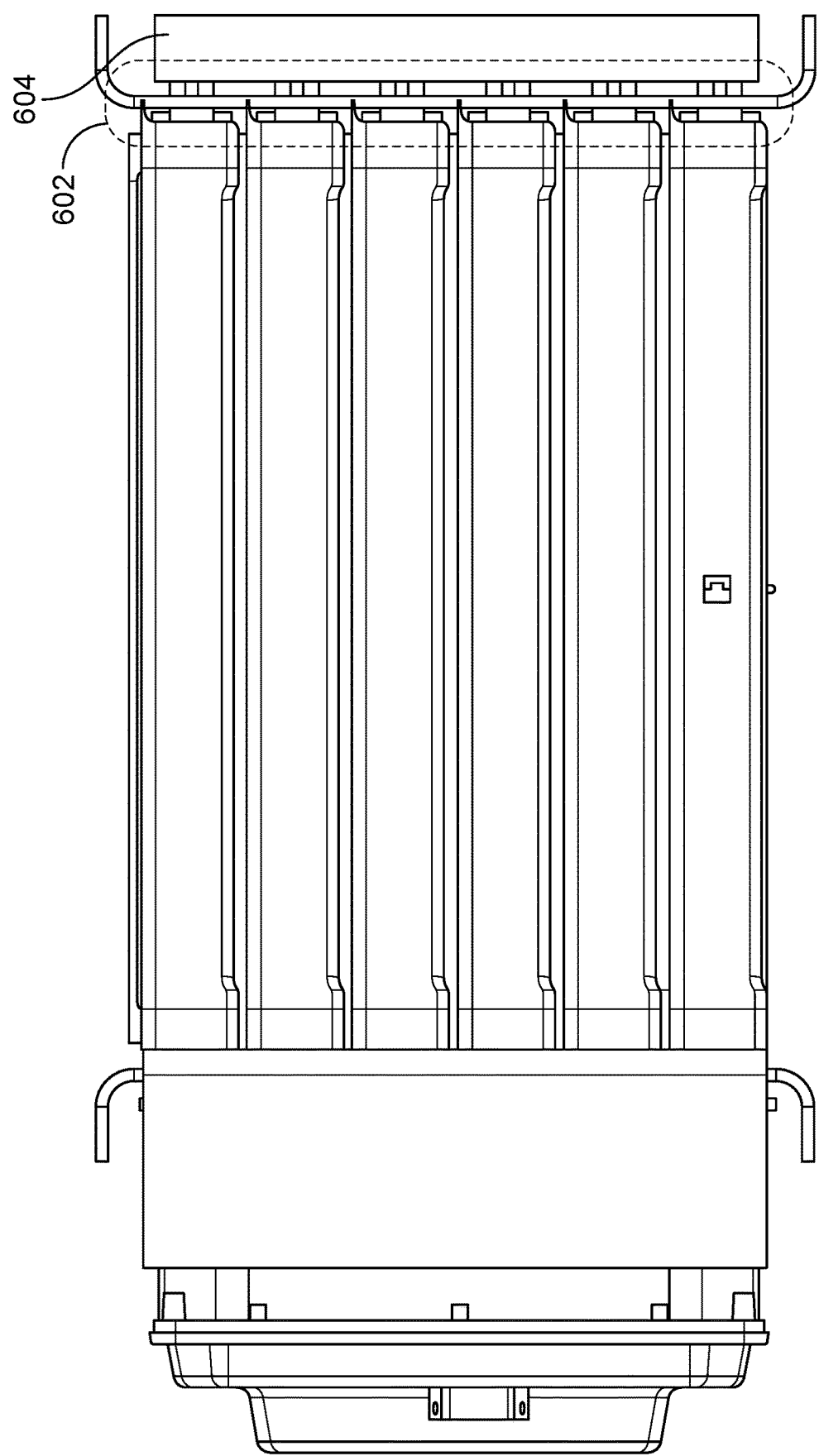
FIG. 6 illustrates an embodiment of a battery block.

FIG. 6 illustrates an embodiment of a battery block. As shown in this example, the exhaust gases from the battery modules are vented out through exhaust ports at 602. Further details regarding the exhaust ports of the battery modules are described below. In this example, outside of the exhaust ports of the individual modules, a heat exchanger 604 (also referred to herein as a heat diffuser) is shown. In some embodiments, the heat exchanger takes the hot air exhausted out of the modules and filters it through a series of perforated metal plates. In this way, the heat from the exhausted gas is dumped into the metal before it exits. The passage of the gas through the various layers of metal causes the exhaust gases to be cooled down by the time the gas leaves this exhaust diffuser (e.g., to be below the ignition temperature of cheesecloth used for a cheesecloth test). As shown in this example, the exhaust diffuser is shared by the modules (where the modules all feed into the same shared exhaust diffuser). In this way, the mass of the entire heat exchange system can be shared amongst the modules.

Battery Module

Figure 7:
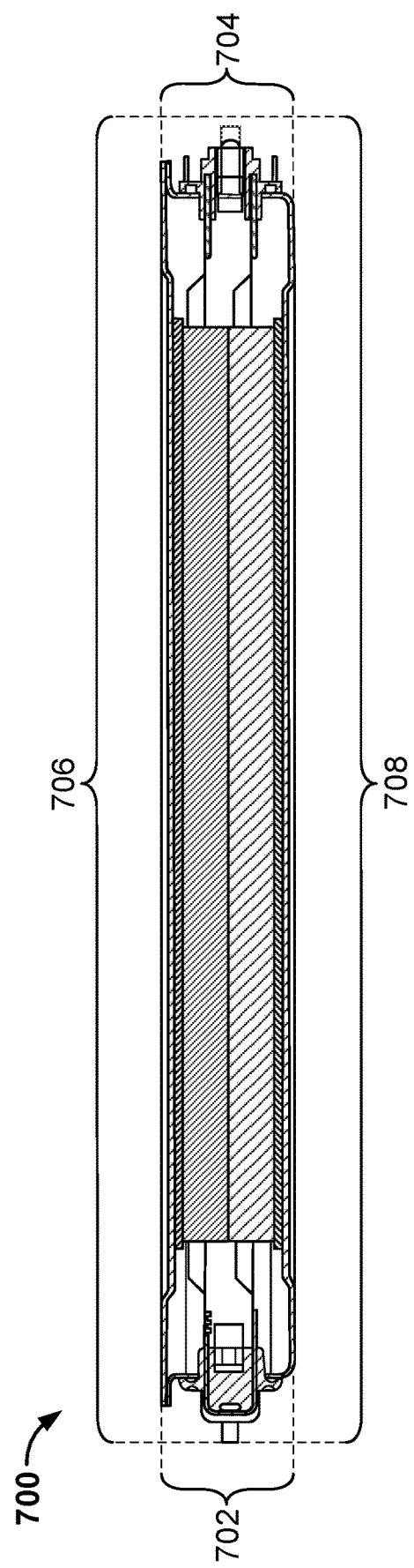
FIG. 7 illustrates an embodiment of a battery module.

FIG. 7 illustrates an embodiment of a battery module. Battery module 700 is an example of module 202 of FIG. 2. In some embodiments, the battery module (also referred to herein as a "can") is a sealed enclosure that includes battery cells. For example, the modules are sealed by a shell that is IP67 sealed. The shell (also referred to herein as a "can") is also made of a thermally conductive material to facilitate thermal management, as will be described in further detail below. A cutout view of a battery module is shown in the example of FIG. 7. In this example orientation of a battery module shown in FIG. 7, a "side" view of the internal structure of a battery module is shown. The portion 702 of the battery module is referred to herein as the "front" or "terminal side" of the battery module. The front of the battery module includes terminals or electrodes for connecting multiple modules together to form a series connection of modules in a battery block, as described above. The terminal side of the battery module includes various electronics such as sensor ports as well. Portion 704 of the battery module is referred to herein as the "back" or "rear" or "exhaust side" of the battery module and includes venting for allowing gases to be expelled, as will be described in further detail below. The portion 706 of the battery module is referred to as the "top" of the module, and the portion 708 of the battery module is referred to as the "bottom" of the battery module.

The following are embodiments of examples of the electrical and thermal design of a battery module.

Battery Module Electrical Design

Figure 8A:
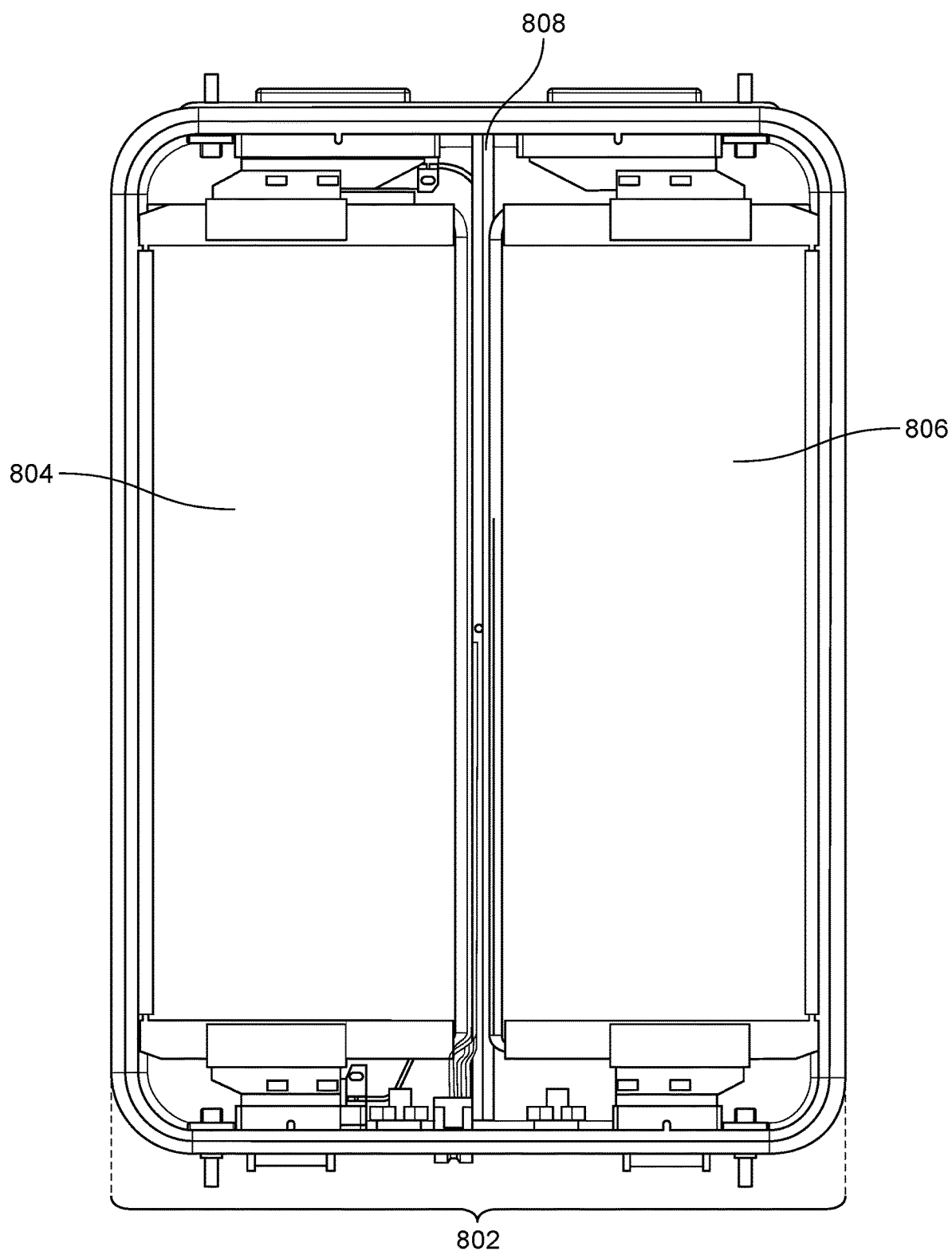
FIG. 8A illustrates an embodiment of a top-down view of a battery module.
Figure 8B:
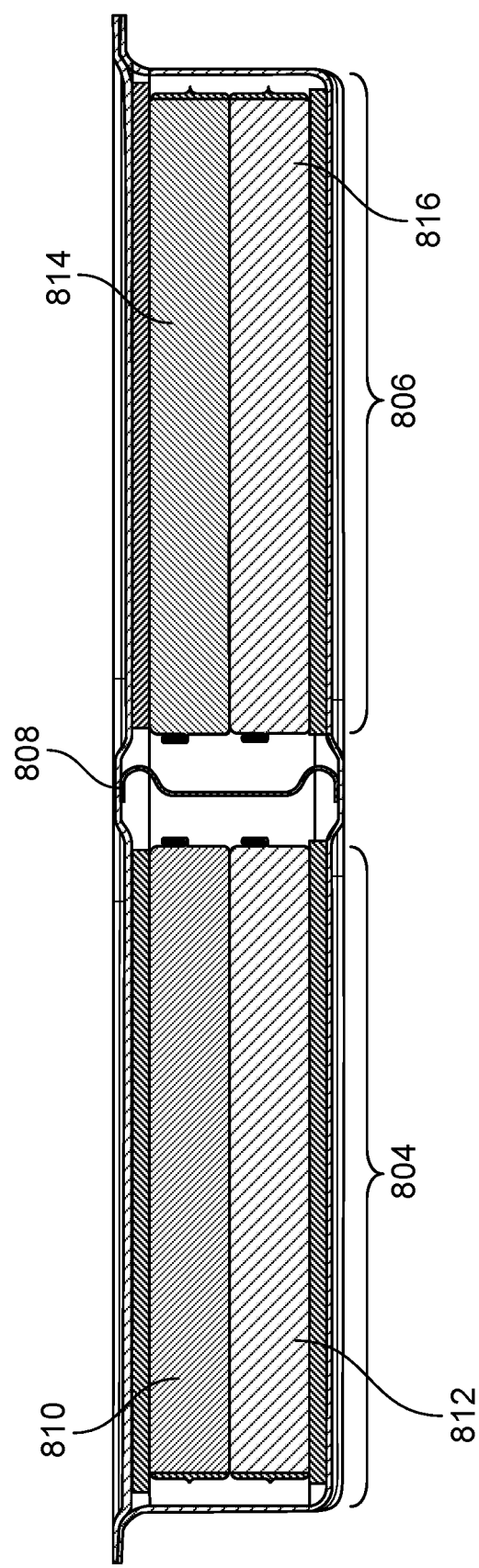
FIG. 8B illustrates an embodiment of a cross-section view of a battery module.

FIGS. 8A and 8B illustrate embodiments of a battery module. In some embodiments, FIGS. 8A and 8B illustrate different perspective views of battery module 700 of FIG. 7.

FIG. 8A illustrates an embodiment of a top-down view of a battery module. As shown in this example, the battery module is oriented such that the front terminal-side of the battery module 802 is at the bottom of FIG. 8A. As shown in this example, the battery module is divided into two compartments or sub-modules, 804 and 806. The compartments are separated by a central partition or rib 808. In some embodiments, each compartment is separately sealed from the other. Within each compartment is one or more battery cells. As one example, the battery cells are lithium-ion cells. In some embodiments, the battery cells are implemented using pouches. In this example, a battery module includes four battery pouches in total, with two battery cells in each compartment. In some embodiments, a battery pouch is substantially planar, and the two pouches within a compartment are stacked on top of each other.

FIG. 8B illustrates an embodiment of a cross-section view of a battery module. In this example, the internal structure of a battery module is shown from the front of the battery module. The central rib of the battery module is shown at 808. The compartments/sub-modules of the battery module are shown at 804 and 806. As described above, in this example, the battery module includes four battery cell pouches, with two pouches in each compartment. In this example, compartment 804 includes battery cells 810 and 812. Compartment 806 includes battery cells 814 and 816. As shown in this example, each cell is substantially planar. Here, there are two cells stacked on top of each other in each sub-module compartment of the module.

In this example, the two battery cell pouches in a compartment are connected in series. As one example, the voltage on each sub-module/compartment has an operating voltage of 4.2V (at top of charge). In some embodiments, the sub-modules of the two compartments are further connected in series, resulting in an overall voltage of 8.4V for the entire battery module 700. For example, a busbar is used to connect the battery cells of the two compartments in series, as will be described in conjunction with FIG. 8C.

Figure 8C:
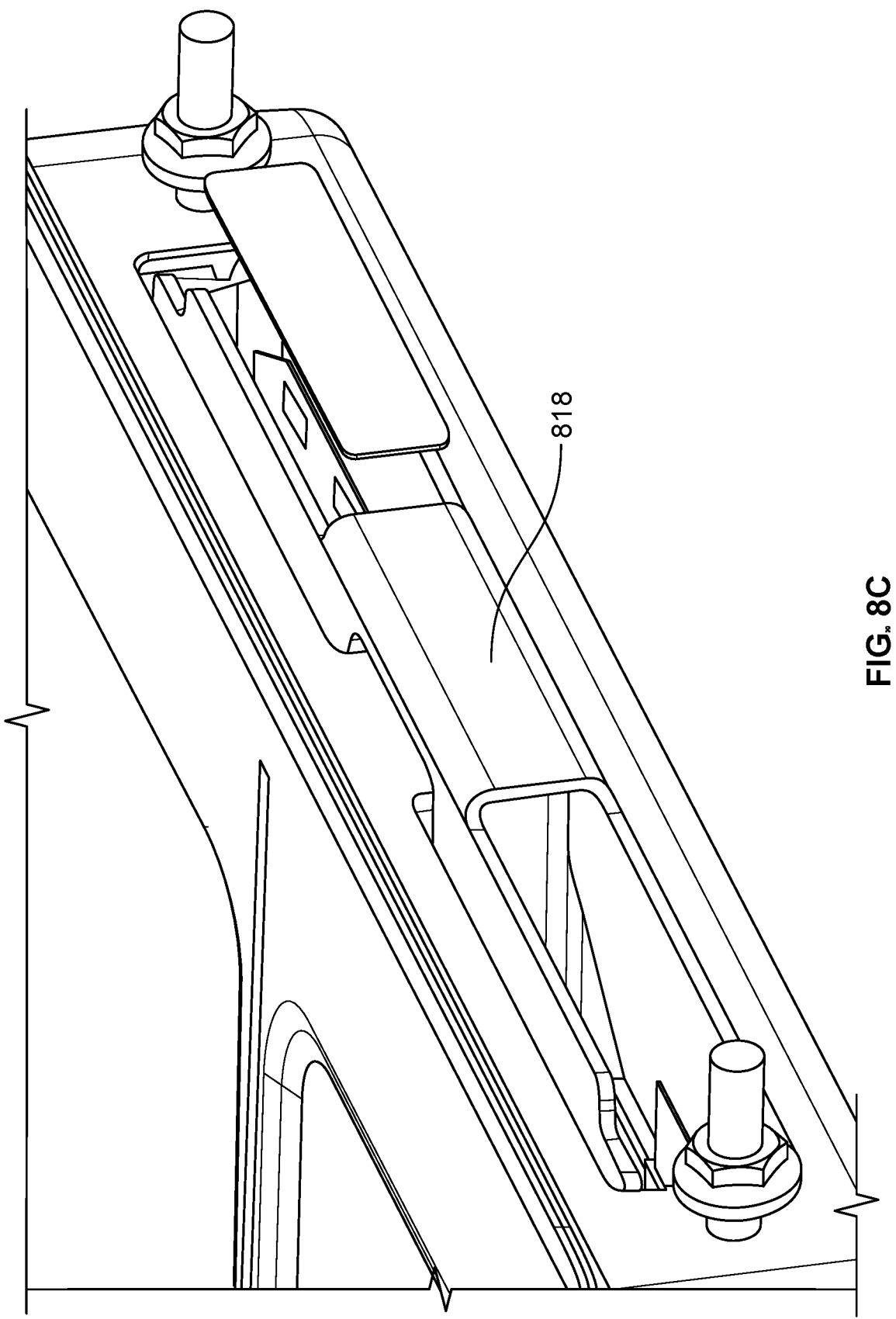
FIG. 8C illustrates an embodiment of a busbar for connecting battery sub-modules.

FIG. 8C illustrates an embodiment of a busbar for connecting battery sub-modules. FIG. 8C illustrates an embodiment of a cutaway of the rear of the battery module. As shown in the example of FIG. 8C, a busbar 818 connects the electrode of one battery sub-module of a compartment to an electrode of the other battery sub-module in the other compartment, connecting the sub-modules in series. As shown in this example, the components of the module are arranged such that they form a "U" shape so that both electrodes of the battery module are on the same face (e.g., terminal-side) of the battery module.

Sensor Layout

The battery module further includes various sensors for measuring the health of the battery module and the battery cells. Further details regarding the arrangement of sensors in a battery module are described below.

Figure 9A:
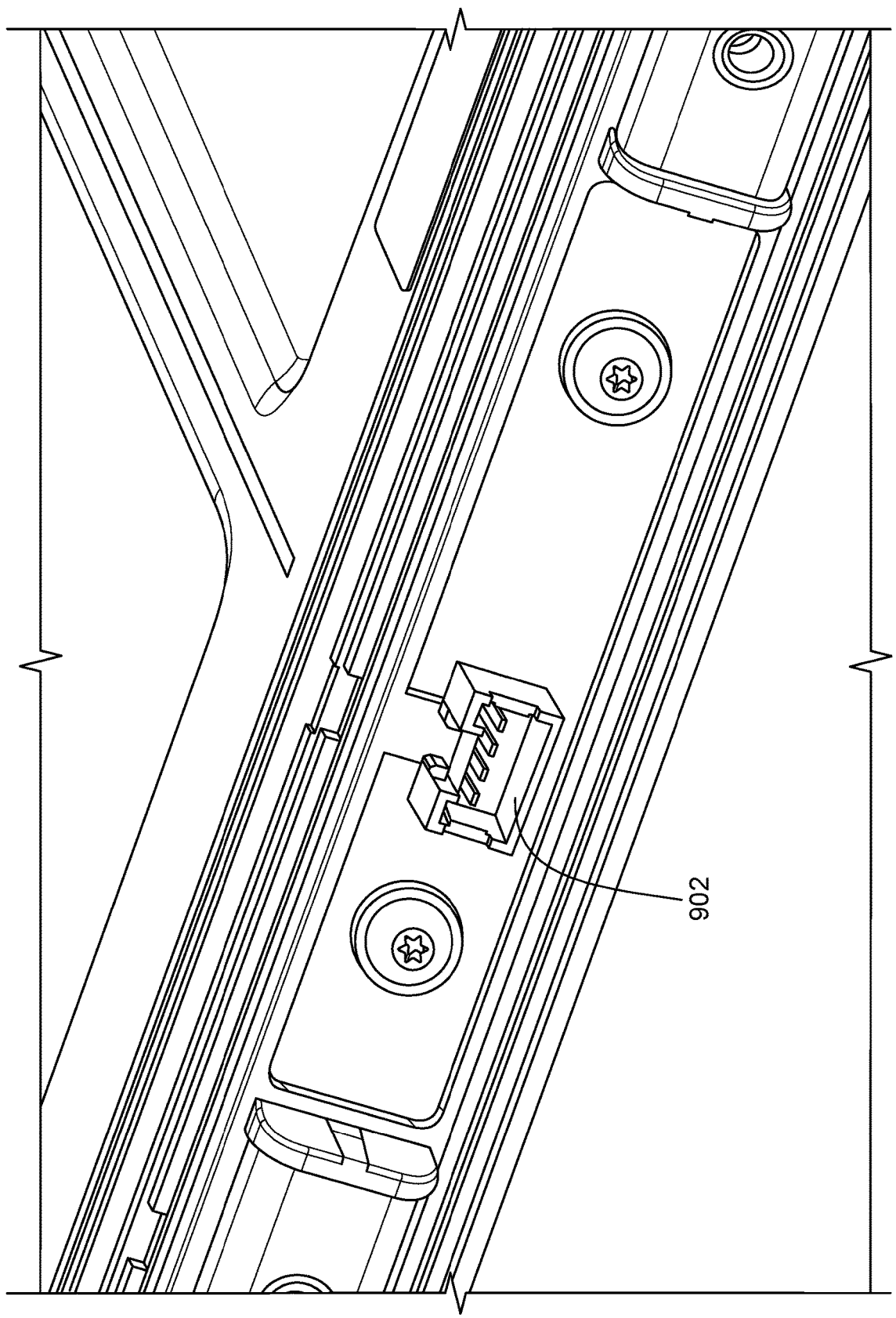
FIG. 9A illustrates an embodiment of a sensor interface of a battery module.

FIG. 9A illustrates an embodiment of a sensor interface of a battery module. In this example, a portion of the front or terminal-side of a battery module is shown. A sensor port or interface is shown at 902. In some embodiments, port 902 provides connectivity to voltage and temperature sensing locations. Having such a port is an improvement over existing sensing solutions, which typically involve running wires or ring terminals to the electrodes of the battery module to collect voltage measurement values. Here, this is done internally, for example, using a wiring harness internal to the module.

Figure 9B:
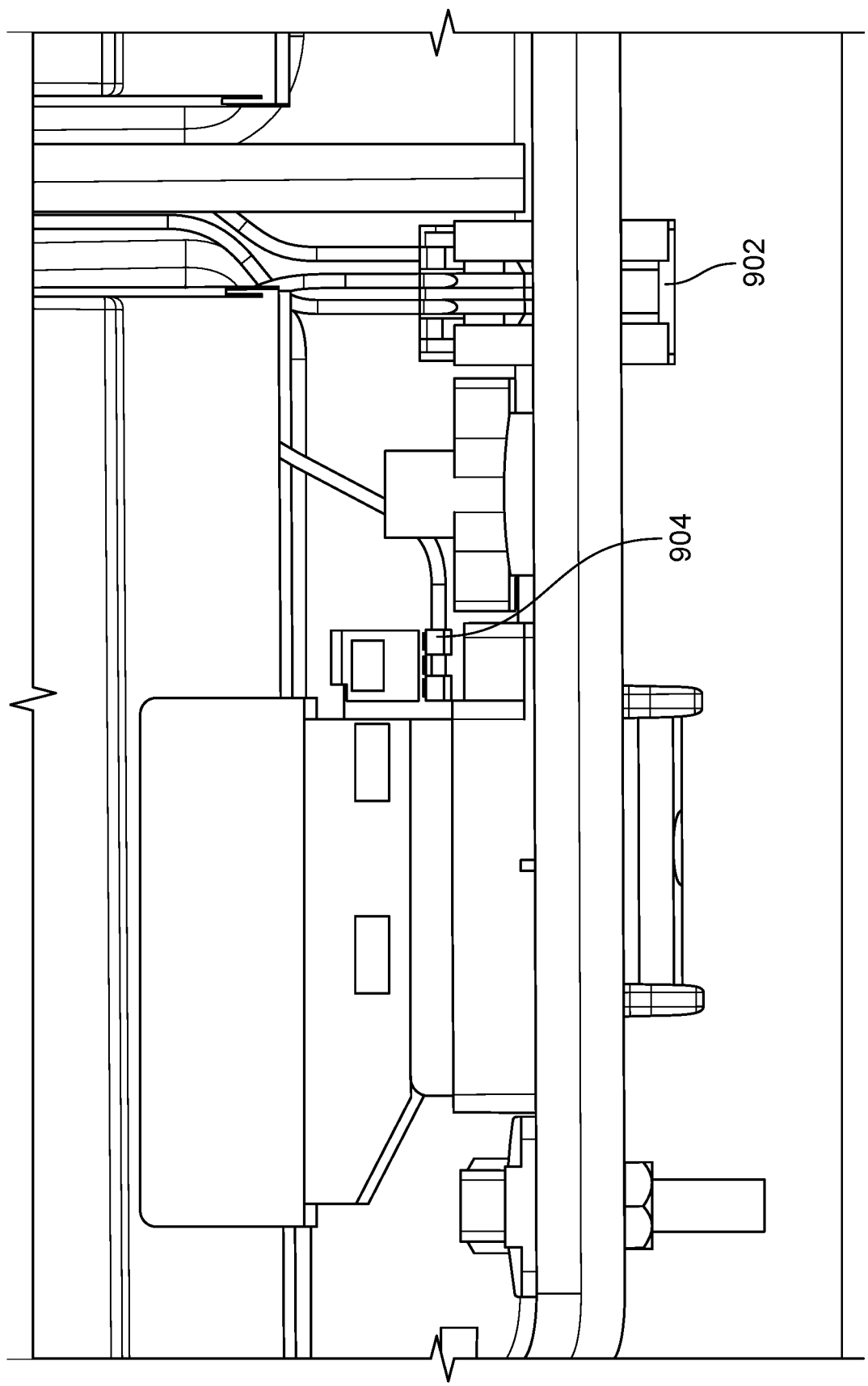
FIG. 9B illustrates an embodiment of sensor wiring of a battery module.

FIG. 9B illustrates an embodiment of sensor wiring of a battery module. In this example, a top-down perspective showing a portion of the terminal-side of the battery module is shown. As shown in this example, the internal wiring harness includes voltage and temperature sensor connection points such as sensor connection point 904 that is connected to the port 902.

In some embodiments, this wiring and sensor arrangement provides improved ease of manufacturing, and is also less expensive to produce. Here, instead of running individual ring terminals to each of the terminals in addition to including external temperature sensors, there is one connector to plug into to obtain all of the data needed to evaluate cell health. The use of such connectors for sensor health is more automatable than handling ring terminals, and does not require attachment of wires in-situ during the assembly process using, for example, ultrasonic welding. Here, the sensors are easily connected to by simply plugging into the provided port. This simplifies assembly at manufacturing time.

In some embodiments, the cell health information is then passed to the external wiring harness described above (that connects to the battery blocks and the inverter), where the information is passed to a computing node for processing and analysis. For example, the computing device is a part of the inverter.

Battery Module Thermal Design

As will be described in further detail below, the design of the battery modules described herein reduces the impact of thermal runaway events. This includes two parts. First, when one cell goes into runaway, the thermal design of the battery module minimizes propagation of the runaway event to as few other cells as possible. As will be described in further detail below, the design of the module provides various layers and barriers to limit the effect of thermal runaway events. Second, the gases are exhausted and cooled in such a manner that the exited gases do not create an ignition source that could ignite objects external to the battery module or system. As will be described in further detail below, the thermal design of the modules includes venting and exhaust ports that facilitate cooling of the gasses.

Preventing Propagation of Thermal Events

FIG. 10A illustrates an embodiment of a battery module. In this example, FIG. 10A illustrates a cutaway cross-section view of the battery module from the front of the battery module.

Insulation

As described above in conjunction with FIG. 8B, the battery module is split into two compartments, where each sub-module includes two battery pouches. In some embodiments, the battery module includes layers of insulation/foam at the top and bottom of the compartments to provide thermal management. Examples of thermal insulation are shown at 1002, 1004, 1006, and 1008.

Thermally Absorptive Pouch

In various embodiments, the battery assembly includes thermal management solutions for inter-module thermal management. In various embodiments, the thermal management solutions include active and/or passive thermal management solutions. Examples of passive thermal management solutions include insulating materials, thermally absorptive materials, etc. In some embodiments, the top of the battery module includes a geometry such as a depression or indentation for locating or holding a thermal management solution such as a pouch of thermally absorptive material. The pouch of thermally absorptive material is used to absorb heat from a runaway event in one battery module and prevent that heat from propagating to the next battery module that is stacked above.

Figure 10B:
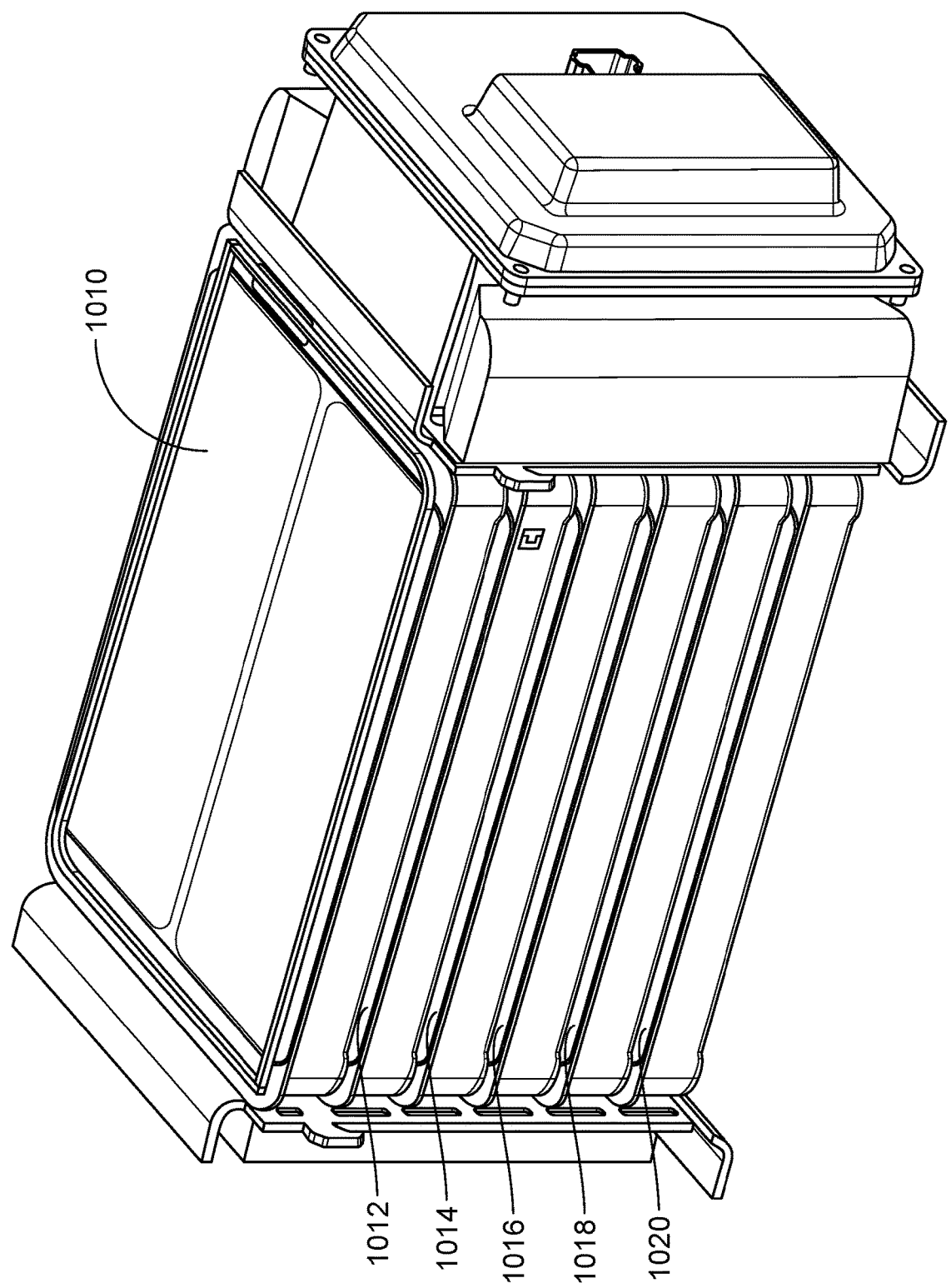
FIG. 10B illustrates an embodiment of thermally absorptive pouches between battery modules.

FIG. 10B illustrates an embodiment of thermally absorptive pouches between battery modules. In this example, a stack of battery modules in a battery block is shown, where one battery module is stacked on top of another battery module. As shown in this example, pouches of thermally absorptive material 1010-1020 are placed on the top of each battery module, such that when one battery module is stacked on top of another, the pouch of thermally absorptive material is sandwiched between the two battery modules. In this way, propagation of heat from the module below to the module above is mitigated. Thus, top-to-bottom propagation of heat is limited.

In some embodiments, the thermally absorptive material in a pouch is a gel. The thermally absorptive material may also include a phase change material. In some embodiments, the thermally absorptive pouch includes a liquid such as water or a liquid that vaporizes or boils off. As described above, the thermally absorptive pouch provides a form of insulation between battery modules and controls or mitigates the impact of thermal events. The thermally absorptive pouch may also be used for cooling during normal operation.

The insulation and thermally absorptive pouches described herein limit top-to-bottom propagation of a runaway event through the assortment of barrier layers described above. For example, when modules are stacked, there are multiple layers between the battery pouches of one module and the battery pouches of the adjacent module. These layers include a top layer of insulating foam of the below module, a layer of steel (the "skin" or outer shell of the module), the pouch of thermally absorptive material described above, the steel shell of the next adjacent module, and a bottom layer of insulating foam of the above module before arriving at the next battery cell. These layers provide "up-to-down" propagation resistance and form a substantial barrier in preventing vertical module-to-module propagation of a thermal runaway event that starts in a cell of a battery module.

Central Divider Channel

As described above, a battery module includes two sealed compartments/sub-modules that are separated by a divider or partition such as a central rib. In some embodiments, the central rib is also designed to limit side-to-side propagation of heat within the battery module.

Figure 10C:
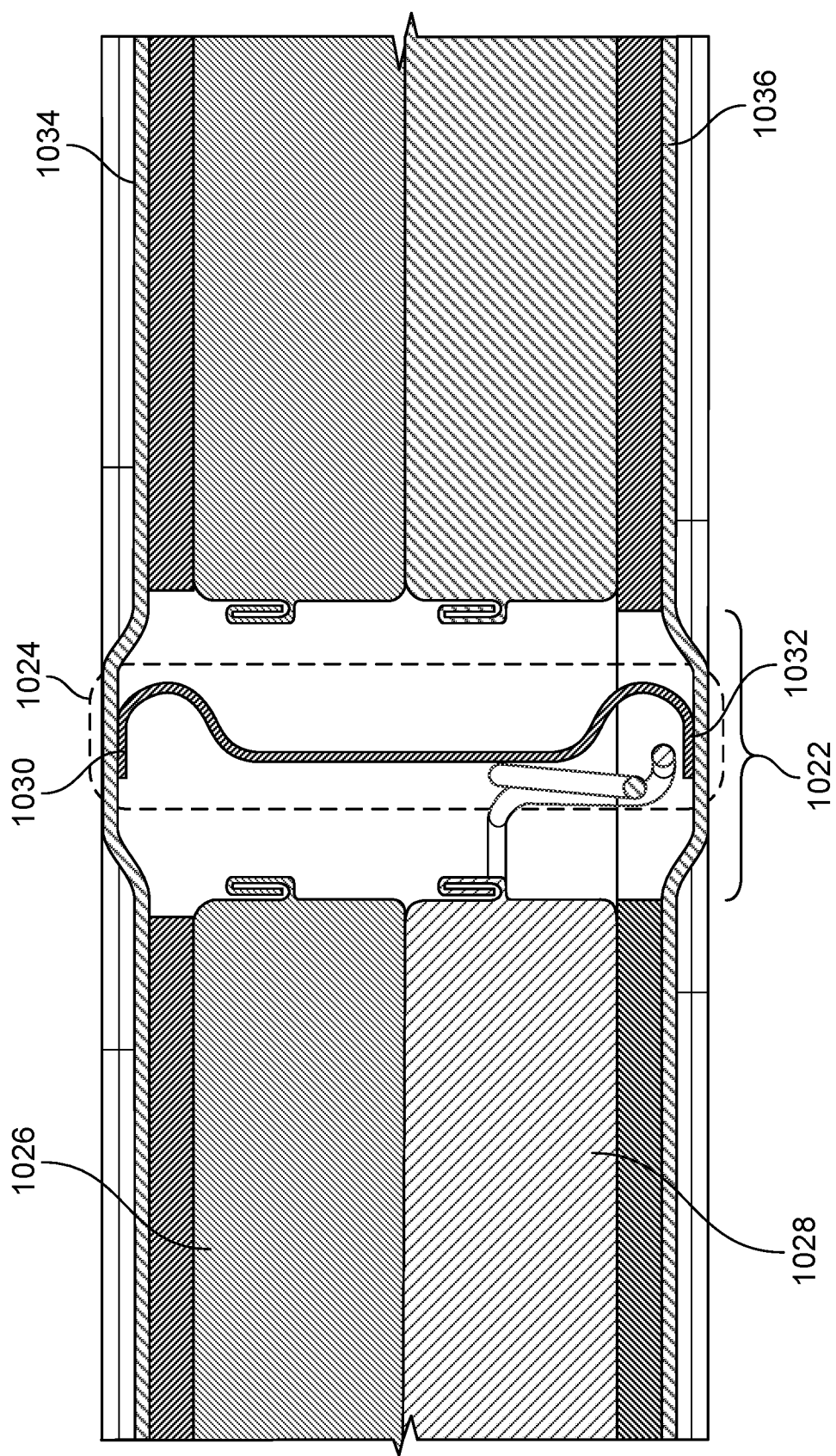
FIG. 10C illustrates an embodiment of a central rib of a battery module.

FIG. 10C illustrates an embodiment of a central rib of a battery module. In this example, a cutaway, cross-section view of the central rib of the battery module from the front of the battery module is shown As described above, the central rib 1022 splits the can or module into two separate compartments or sub-modules. In some embodiments, the central rib is manufactured in steel.

In this example, the central rib includes a channel. The central rib further includes an internal piece of metal 1024 that divides the channel into two sub-channels. The divider 1024 provides a wall between the two compartments within the battery module. The internal wall limits the propagation of heat from one sub-module to the other sub-module within the battery module. In some embodiments, the internal piece of metal also provides structural support.

As shown in this example, the space between the inner wall 1024 and the battery cell pouches (e.g., cell pouches 1026 and 1028) also provides thermal insulation by providing an air gap. If a thermal event causes the creation of a large volume of hot gas on, for example, the left side of FIG. 10C, on the left side of the wall, there is now a large air gap, providing a "thermos" between the hot gas in the compartment on the left and the battery cells in the compartment on the right. In some embodiments, the battery cell pouches (or whatever energy storage components or devices are encapsulated in the enclosure of the module) are insulating on their own.

Further, as shown in the example of FIG. 10C, the internal wall 1024 of the central rib touches, at its top and bottom points (1030 and 1032, respectively), respective top and bottom layers of metal 1034 and 1036. This allows heat on the wall to be transferred to the surrounding metal, directing it away from the battery cell pouches (where, as shown in this example, the steel is on the outside of the foam, providing another barrier between the cell pouches). In some embodiments, the metal that the top and bottom points of the internal wall 1024 touch are also in contact with the pouches of thermally absorptive material described above, further facilitating the transfer of heat away from the compartments and to the thermally absorptive material.

Here, the channeling of gasses, the barriers such as air gaps, as well as the transfer of heat away from battery cells provide left-to-right propagation resistance, making it difficult for the heat from one compartment of the module to reach the battery cells in the other compartment. That is, the use of the inner channel and central rib as described herein limits "left-to-right" propagation, where the propagation of a runaway event in one sub-module to the battery cells in the other sub-module of the battery module is limited. For example, suppose that the top left pouch 1026 is the initiating pouch (that goes on fire). The runaway event will propagate to the pouch 1028 below in the same compartment as they are touching each other. This will result in the generation of heated gases in that compartment (e.g., due to vaporization of the electrolytes in the battery cell pouches). The region within the rib between the pouches and the internal wall 1024 acts as an air gap, which in conjunction with the barrier provided by the internal wall 1024 of the central rib, seals off one compartment from the other, limiting the propagation of heat to the other compartment. In some embodiments, the channel also provides an exhaust pathway that routes or channels the generated hot gas out of an exhaust port, further details of which will be described below.

Thus, using the battery module thermal design described herein, propagation of thermal runaway events is limited. This includes limiting top-to-bottom propagation (e.g., between modules of the battery stack), and limiting left-to-right or side-to-side propagation (within the module).

Exhausting of Heated Gases and Cooling of Exhausted Gases

As described above, the battery modules include vents for exhausting hot gases that are generated in the compartments of a module during a thermal runaway event.

Figure 11A:
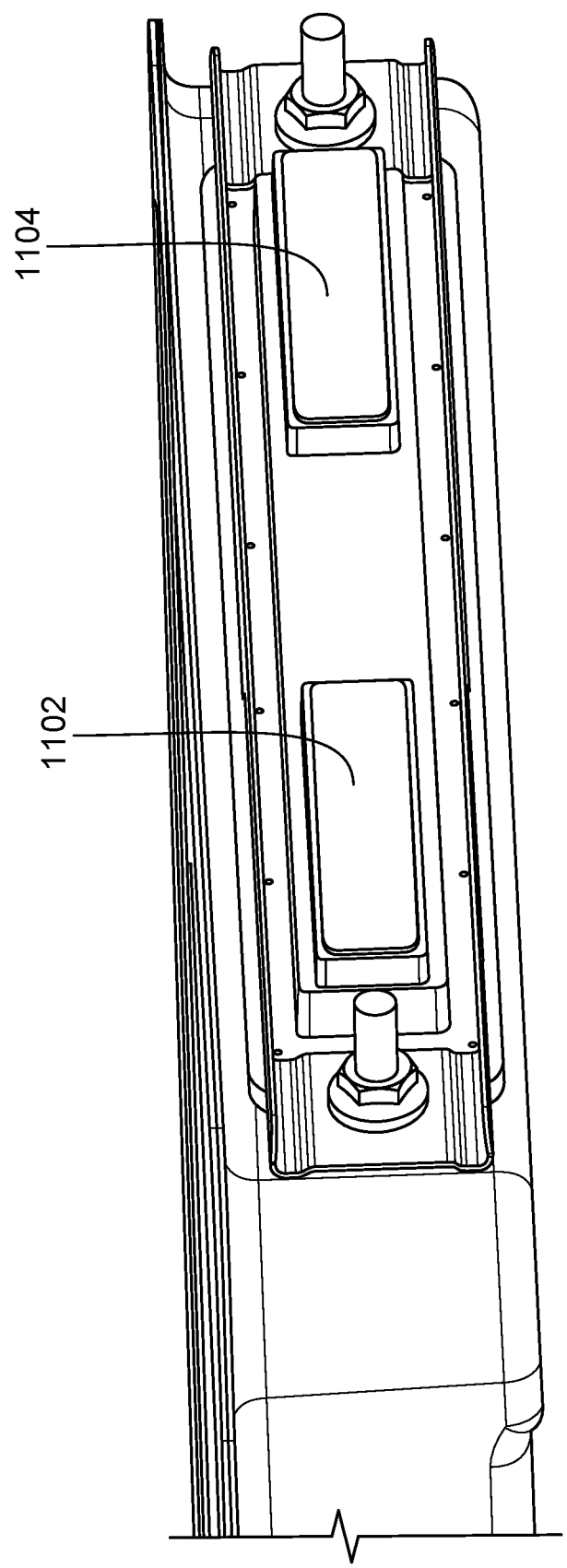
FIG. 11A illustrates an embodiment of exhaust ports of a battery module.

FIG. 11A illustrates an embodiment of exhaust ports of a battery module. In this example, a view of the rear (exhaust-side) of a battery module is shown. In this example, there are two vents 1102 and 1104, one for each of the two compartments/sub-modules of the battery module. The exhaust ports 1102 and 1104 are used to manage the gas generated by the cells during a thermal runaway event.

In this example, the vents are shown closed off by stickers. In this way, during normal operation, the battery modules are sealed. In some embodiments, elevated pressure in the module, such as due to heated gases caused by a thermal runaway event, causes the stickers to be blown off, opening up the exhaust ports, allowing the gases built up inside the compartment of the module to be exhausted out. In this way, the gases may be vented out, cooling the module.

For example, during a thermal runaway event as described above, when a cell in one module ignites, the hot gases are exhausted through the central rib and directed to the exhaust ports/vents, where the heated gases caused by the ignition event cause the stickers to blow off, allowing the heated gases from inside of the module to be exhausted out of the "venting side" of the module.

Figure 11B:
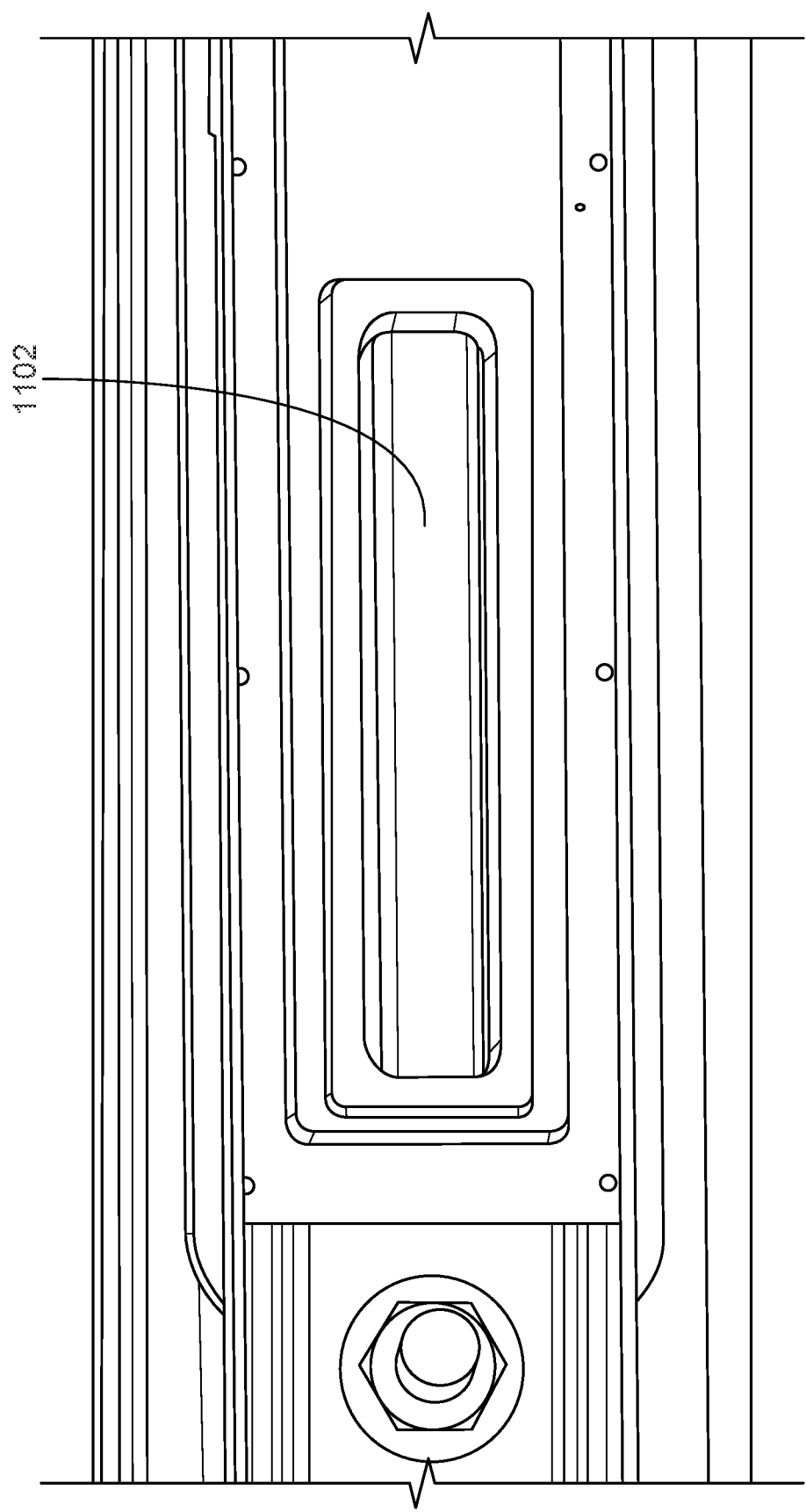
FIG. 11B illustrates an embodiment of an exhaust port of a battery module.

FIG. 11B illustrates an embodiment of an exhaust port of a battery module. In this example, exhaust port 1102 is shown without the covering sticker. In this example, when an event such as a thermal runaway event occurs, the battery cell pouches, which are filled with electrolytes, break where they are weakest. This results in a large volume of super-heated gas to be released. As described above, when a thermal runaway event occurs, a sticker blows off to allow the gas from one compartment of the module to vent into a shared exhaust diffuser (e.g., diffuser 604 of FIG. 6). In some embodiments, the vent/exhaust port is connected to the thermal diffuser via a sealed pipe or passage. In this way, exhaust gases are forced to be directed through the diffuser, cooling the exhaust gases, thereby reducing the risk of igniting surrounding objects and increasing safety.

Battery Storage System Design for Installation

In some embodiments, the various components of the battery storage system described herein are designed to reduce installation complexity and improve the ease of installation.

The battery storage system described herein is scalable, where the battery blocks described above are stackable to create battery storage systems with varying capacities. In some embodiments, installation of the battery storage system includes wall mounting of the battery blocks that make up the battery storage system, and then connecting the battery blocks together and to the inverter. Described herein are designs that facilitate ease of wall mounting of the battery blocks, as well as simplified electrical connection of the battery blocks to an inverter.

Wall Mounting

Figure 12A:
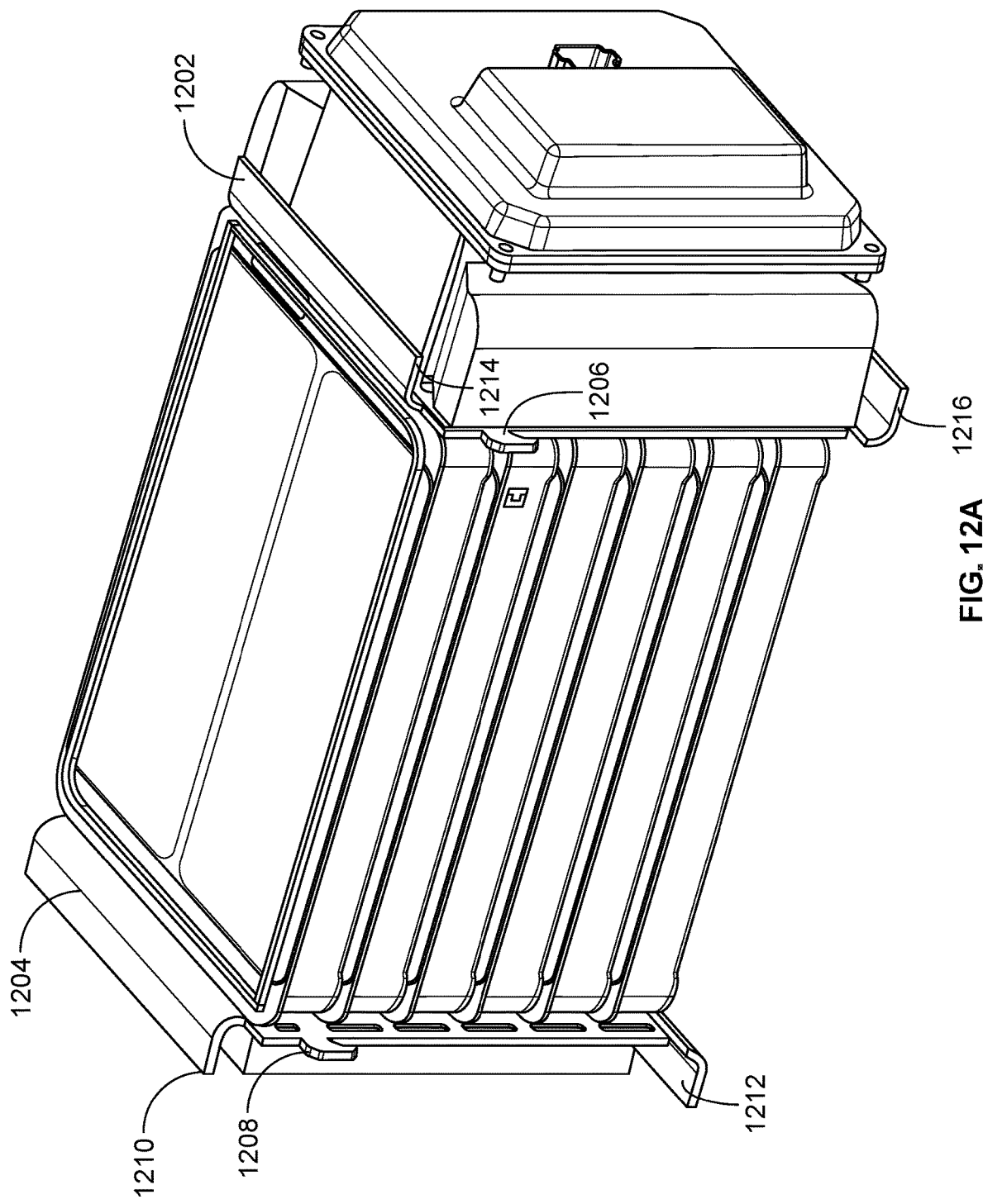
FIG. 12A illustrates an embodiment of a battery block.

FIG. 12A illustrates an embodiment of a battery block. In this example, a perspective view of a battery block is shown, where the view is from that of a transparent wall to which the battery block is attached.

Frames 1202 and 1204 are shown in this example. The frames run along the fronts and backs of the battery modules in the battery block. In this example, the frames 1202 and 1204 have hooks 1206 and 1208, respectively. In some embodiments, during installation, a bracket such as a wall cleat is mounted to the wall. The battery block is then mounted to the wall by hanging or hooking the hooks of the frames of the battery block onto the wall cleat. The hooks are portions of the frames that support the battery modules when hung on the wall. There are two frames shown in this example. When the battery block is hung on the wall, the two frames are being supported by the hooks and the wall cleat. The frames in turn hold up the stack of battery modules in the battery block. That is, the frames provide a mechanical base structure. Hooks are but one example of a geometry usable to attach the battery block. A wall bracket is but one example of a compatible wall-mounted component.

In some embodiments, the battery modules are bolted to the battery block frames, where the frames are then mounted to the wall via the hooks, as described above. In this way, the battery block is mechanically supported. In some embodiments, the frames also have cutouts for ambient air to flow.

As shown in this example, the frames also have curved lips/flanges 1210, 1212, 1214, and 1216. These lips provide mechanical structure. Further, when the block is set down, the lips provide feet for lifting the blocks off of the ground. The curvature of the flanges also provides increased stiffness against flexing of the frames. The flanges further distribute force evenly across the block in the event that a battery block is accidentally dropped. In this way, the force is not all on one corner of the can or module.

Figure 12B:
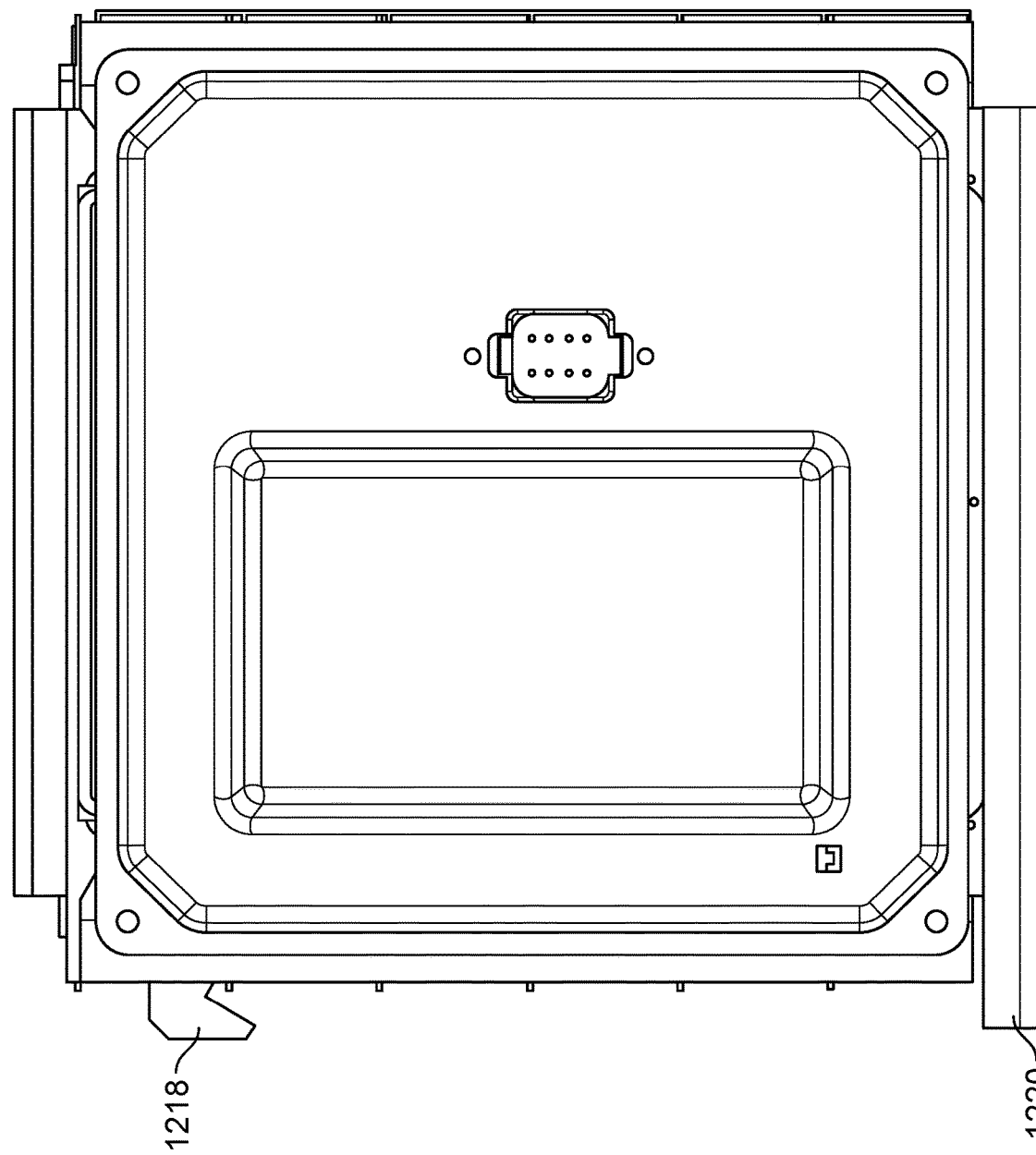
FIG. 12B illustrates an embodiment of a battery block.

As shown in this example, the bottom portions 1212 and 1216 of the frames protrude. The protrusions touch against the wall to provide stability and anti-rotation support. FIG. 12B illustrates an embodiment of a battery block. In this example, a "terminal-side" view of a battery block is shown. An example of a hook 1218 and protruding anti-rotation portion 1220 of the bottom of a frame are shown in the example of FIG. 12B.

Wiring Harness

After the battery blocks and inverter are mounted to the wall as part of the installation process, they are then electrically connected together. In some embodiments, a wiring harness such as that described above (where a segment of an external wiring harness is shown at 312 of FIG. 3) is used to connect the battery blocks and the inverter together, simplifying the wiring installation process.

FIG. 13 illustrates an embodiment of a power system. The following is an example of a power system with an energy storage system with multiple battery blocks stacked on top of each other. In some embodiments, power system 1300 is an example of power system 100 of FIG. 1. In this example, a 20 kWh system is shown with 4 battery blocks (where each battery block is a 5 kWh subsystem). While an example battery system with four battery blocks is shown for illustrative purposes, the modular and scalable battery system may be configured to have any number of battery blocks, as appropriate. In this example, the battery system is mounted on the wall, without an aesthetic cover or shield shown.

A wiring harness is shown at 1302. In this example, the wiring harness has five connectors on it; one for each of the four battery blocks, and one connector that plugs into the inverter 1304 via plug 1306. In some embodiments, inverter 1304 is an example of inverter 102 of FIG. 1.

As described above, each battery block has a DC-DC converter, which all feed into the one central inverter 1304. The inverter is responsible for converting between power from the battery, power from the solar panels, and power from the grid, and trading between them as needed by the power system.

In some embodiments, the battery blocks are individually connected to the inverter, without daisy chaining or serialization. Here, in this example, the inverter sees four different battery block inputs. In this way, power from the battery blocks may be controlled or treated individually by the inverter. Further, if a user has a system with fewer batteries, either intentionally or by accident, the battery system can still operate. For example, if one of the connectors was to become unplugged or one of the battery blocks was to go offline, the other battery blocks would still be able to work independently (without being impacted by the offline battery block). Additionally, if the battery blocks were out of balance (e.g., one was less healthy than the other three), the weakness of one battery block does not limit the effectiveness of the other battery blocks.

There are various benefits to the modular battery storage design described herein. For example, there are various thermal benefits of the battery block and battery module designs described herein. As described above, during normal thermal operation, air directly passes over the outer surface of a can or module. This in contrast to existing battery systems, where the cans holding battery modules are typically further included in another sealed enclosure. Here, in this example, there is not another enclosure into which the modules are placed. This provides various benefits. For example, additional enclosures need not be built. As another benefit, there is a reduction in the number of layers between the heat of the cells to be removed and the ambient air. The battery module design and cooling described herein is more thermally efficient, as well as more mass cost-efficient, compared to existing battery systems.

Further, using the cooling designs described herein, not only are thermal events and exhaust gases managed, environmental exposure is also managed. This is unlike existing battery systems that employ internal cans to manage the safety cases described herein. Existing cans are typically either not entirely sealed, or the cans themselves are prone to corrosion damage, thus requiring the need for yet another sealed box, which is not needed using the battery design described herein.

Improved ease of installation is also facilitated by the battery system design described herein. For example, using the battery blocks described herein, the installer simply takes the battery blocks, hangs them on the wall, and then plugs in the wiring harness to the battery blocks and the inverter. Further, installation safety is also improved, as the installer need only plug in the touch-safe wire harness connector. Further, an electrician need not be required for this portion of connecting battery blocks. For example, after an inverter has been installed and wired into the building, the wiring harness can be easily plugged in.

Described above are embodiments of a battery assembly (e.g., battery block). In some embodiments, the battery assembly includes a stack of substantially planar modules. Each module has an inner set of battery pouches, a top insulator layer, and a bottom insulating layer. Each module further includes a side region with thermally conductive material. Each module further has a thermally conductive shell. The thermally conductive shell may be made of metal. The shell has a bottom, sides, front, rear, and top. In some embodiments, the front of the shell is the terminal side of the module that houses electrical connections such as electrodes. Via the electrodes, the modules may be connected together (e.g., serially) and their output provided to a DC-DC converter of the battery assembly, as described above. The rear of the shell includes the venting side or heat exchanger side of the module, from where gases are vented or exhausted out. In some embodiments, the shell is in communication with a blow-out valve. The blow out valve is in communication with a common exhaust diffuser that is common to all of the modules. In some embodiments, the back blow-out valve is in communication with a sealed passageway. The sealed passageway directs gas out of the valve to the exhaust diffuser.

In some embodiments, a thermally absorptive material is included on the top of the shell of the module. In some embodiments, the thermally absorptive material includes phase change liquids such as liquids that boil off or vaporize.

In some embodiments, the battery assembly includes a forced air system that causes air to flow along the sides of the module such that heat is transferred from the inner battery pouches to the outer sides to a heat exchanger. This cools the battery assembly during normal operation, where the shell of the module is in direct communication with the outside ambient air. That is, the same thermally conductive shell that seals the battery pouch cells is also thermally conductive to allow heat dissipation and transfer of heat away from the battery pouches. Further, exhaust gases are managed within the thermally conductive sealed shell (rather than having another outer shell to manage exhaust gases, as is the case in existing battery systems in other applications such as automotive and aircraft spaces). In some embodiments, the battery assembly is covered by a vented shield.

Cell Temperature Regulation

Described above are embodiments of cooling the cells in the modules of a battery block using ambient air. As described above, for example, in conjunction with FIGS. 4B and 4C, a fan 404 is used to draw air from the right side of the battery block, across the sides of the battery modules (where the shells are thermally conductive), then over the heat sink to which the power electronics (e.g., DC-DC power converter) are attached, and then out the left side of the battery block. In this way, the ambient air drawn in by the fan is used to cool both the battery cells and the electronics in a battery block.

In the cooling configuration described above, the fan is run in what is referred to herein as the "forward" direction. In some embodiments, the fan is a bi-directional fan that may be run in both "forward" and "reverse" directions. As will be described in further detail below, the use of such a bi-directional fan, along with the cell temperature control techniques described herein, allows for not only cooling of battery cells, but also heating of the battery cells, as well as maintaining of the temperature of cells within a desired range. For example, the bi-directional fan may be run in different directions for various amounts of time at various speeds to achieve a desired temperature control goal or target.

The following are further details regarding cell thermal regulation.

Cell Heating

In some embodiments, heating of the cells in the battery modules is facilitated by running the bi-directional fan 404 in reverse. For example, in the example of FIG. 4C, when the fan is run in the "forward" direction, ambient air is drawn from the right side of the battery block, where it passes along the channels of the battery module, absorbing heat from the battery cells, cooling them down. The air is then driven past the heat sink to which the DC-DC power converter and other power electronics are attached, where the waste heat from the DC-DC power converter is transferred to the air (thereby cooling the DC-DC converter). The heated air is then pushed out the left side of the battery block.

When the fan is run in the reverse direction, ambient air is drawn, by the fan, from the left side of the battery block (where the opening on the left side of the aesthetic cover is now the inlet, and the opening of the right side of the aesthetic cover is now an outlet). The ambient air is then heated by the waste heat generated by the DC-DC power converter. The heated air is then drawn in by the fan and pushed to the right, such that the heated air passes over the battery modules, thereby causing the cells to be heated.

In this example, the source of heat for heating up the drawn in ambient air is the waste heat of the DC-DC power converter. In other embodiments, a battery block includes a dedicated heater for heating the air. The DC-DC power converter may be used standalone or in conjunction with the dedicated heater. That is, in various embodiments, the heating energy used to warm up the air being drawn by the fan may be from DC-DC waste heat (e.g., based on the running of the DC-DC power converter, or by intentionally running the DC-DC power converter at low efficiency), fan waste heat, a designated heater, etc.

As another example, in some embodiments, the source of heat for warming the air being drawn across the cells may be a dedicated auxiliary heating element such as a heating coil. In some embodiments, the auxiliary heating elements are placed in the battery pack. As another example, a heat pump is used to heat the battery cells. The use of such dedicated heaters as a primary heating source provides heating that may be more efficient than relying on heat from control electronics to be transferred by air.

The following are examples of techniques for increasing the waste heat generated by the DC-DC power converter of the battery block. In some embodiments, the DC-DC power converter is run intentionally with low efficiency (e.g., zero efficiency), thereby using the DC-DC power converter as a heater. For example, the DC-DC power converter is operated to have a net throughput of zero. However, as current is flowing within the converter at high frequency, this creates loss (waste heat) without pushing net power. This is inefficient from a power output to waste heat standpoint, but is desirable in this heating scenario.

In some embodiments, the bi-directional fan need only be high efficiency in the forward direction for cell cooling. In reverse mode, inefficiencies of the fan may help to promote heating. For example, when using the bi-directional fan for cell heating, lower fan efficiency is acceptable. In some embodiments, the DC-DC power converter and the bi-directional fan are intentionally run at low efficiency to generate waste heat. In this case, a designated heater may not be needed. For example, if the fan were low efficiency when running in reverse, then the electricity will be turned to heat, contributing to the goal of heating the battery cells.

Heating of the cells by running the bi-directional fan in the reverse direction may be performed for various reasons and to achieve various control targets.

Cold Start Heating

In some embodiments, running a bi-directional fan in the reverse direction is used to provide heating for cold start in cold weather. In some embodiments, running the fan in reverse is the primary cell heating technique for cold start in cold weather. In other embodiments, running the bi-directional fan in the reverse direction is used as a secondary cell heating technique that is used in conjunction with primary cell heating techniques such as heaters, heat pumps, thermoelectric heating elements, etc.

Referring to the example of FIG. 4C, when the fan is run in reverse during cold weather, cold air is drawn into the battery block by the fan, where the air is warmed by the heat from the DC-DC power converter and/or a dedicated heater, and then pushed over the battery cells, warming them, where the air then continues to the right and is exhausted out of the battery block.

In this example of cold start, the ambient air is cold. In some embodiments, when the ambient air is cold, the fan speed is regulated to be ultra-low. In this way, the air is passed through the battery block slowly, such that the air loses the majority of its heat to the battery modules before it drifts out of the other side of the battery block. In some embodiments, the fan is run at ultra-low speed by pulsing the fan (e.g., causing the fan to rotate a quarter turn at a time). In this case, where the ambient air is cold, the DC-DC power converter will still be cooled by the cold air, even if the fan is driving at a low speed (and the air flow/cubic feet per minute (CFM) over the power converter is low).

In other thermal states, such as where the ambient temperature is not as cold (and cold start of the energy storage system is not being performed), but the cells should still be heated, the fan may be run in reverse mode, but at a higher speed to allow for the DC-DC power converter to be cooled.

Although the energy usage efficiency may be low, it may be still more optimal than releasing all of the DC-DC waste heat to the ambient air, in which 100% of the DC-DC waste heat is wasted. Further, as compared to running the fan in the forward mode, in which both the battery cells and the DC-DC power converter are cooled, in the reverse mode, the DC-DC power converter may still be cooled, while the battery cells are not subjected directly to the cold ambient air, but instead to the air warmed by the waste heat generated by the DC-DC power converter (that is, there is an improvement as compared to running the fan in the forward direction, where the battery cells would be exposed to the unheated cold ambient air).

Cell Temperature Regulation

Described above are embodiments of using a bi-directional fan to support heating and cooling of the battery cells/block. More generally, cell temperature control may be provided using the techniques described herein. In some embodiments, and as will be described in further detail below, in addition to cooling and heating the battery cells, the bi-directional fan may be controlled in such a manner to maintain the temperatures of the cells to be in a desired range.

That is, the bi-directional fan may be used for general cell temperature control. For example, during normal operation of the energy storage system, it may be beneficial to maintain the temperature of the battery cells in a desired temperature range (e.g., in an optimal temperature range for optimal cell performance). The bi-directional fan may be run seamlessly in both direction and flow rate to either cool or heat the cells, with forward, zero, and reverse air flow in order to achieve a desired air temperature. For example, the fan flow rate may be modulated by changing fan RPM (revolutions per minute) in both directions continuously or stepwise, as desired. In addition, a desired air temperature (before the air heats the cells) may be achieved by adjusting air heating power and air flow rate. As will be described in further detail below in conjunction with FIG. 14, the flow direction, flow rate, and air heater power may be controlled via a temperature control logic to allow the cells to operate in a healthy temperature range, where there may be different ranges for different goals (e.g., safety, lifetime, power, capacity, SOC (state of charge) balancing, combined performance, etc.).

Maintaining a Desired Cell Temperature Range and Improving Temperature Uniformity In some embodiments, during normal operation (or relatively lower temperature operation), the fan direction and fan speed/velocity are modulated intermittently or continuously (e.g., by sweeping between −10 CFM to +10 CFM). Such modulation of the fan allows the cell to operate in an optimal temperature zone with a small temperature variance across the cells of a battery module (where such variance is also referred to herein as "delta-T" or "ΔT"). In some embodiments, the fan is operated in a push-pull mode so that the overall pressure inside the battery block is maintained without lowering the overall pressure (and thereby causing outside air to be drawn in).

The ability to regulate/control the temperature of the battery cells to be within a specified range of temperatures has various benefits. For example, the ΔT across the cells may be regulated to maintain the health of the cells, improving their longevity. This may be achieved by running the fan back and forth (e.g., intermittently reversing the fan periodically), which results in the delta-T of the cells being reduced. In this way, by having air flow in two directions, the temperature gradient is reduced (as compared to one way air flow, which would result in a temperature gradient from one end of a battery module to the other).

As another example of cell temperature regulation, rather than having the fan change directions back and forth, the battery block is transformed into a closed air loop system (further details of which are described below) in which air is recirculated within the battery block, making the temperature of the battery block more uniform. In some embodiments, the fan velocity may also be modulated to facilitate control targets such as maximum power density or power output.

Temperature Control Logic

As described above, by modulating fan parameters of a bi-directional fan, such as RPM (revolutions per minute) and direction, the fan is able to drive air in either direction, or switch air direction intermittently for different purposes. In some embodiments, the fan is driven according to temperature control logic. In some embodiments, the temperature control logic is executed by a temperature control system. In some embodiments, the temperature control system is implemented in a computing module, where the computing module may be a part of the inverter. In some embodiments, the temperature control system is configured to control the temperature at a battery block level, where the temperature of each battery block may be regulated independently of the other blocks. The temperature control system may also monitor each battery block individually and coordinate aggregate cooling of the energy storage system by providing individual control of each battery block. The temperature control system may also control subsets of blocks of the energy storage system as a group, or determine an overall operating mode of the heating/cooling systems of each block.

In some embodiments, the temperature control system may determine, for a given block, the mode of operation for heating/cooling of the battery block, where the bi-directional fan is controlled in different ways for different modes of operation. There may be various triggers for determining when to transition between different temperature regulation states/modes. Further details regarding embodiments of logic for cell temperature control are described below.

Figure 14:
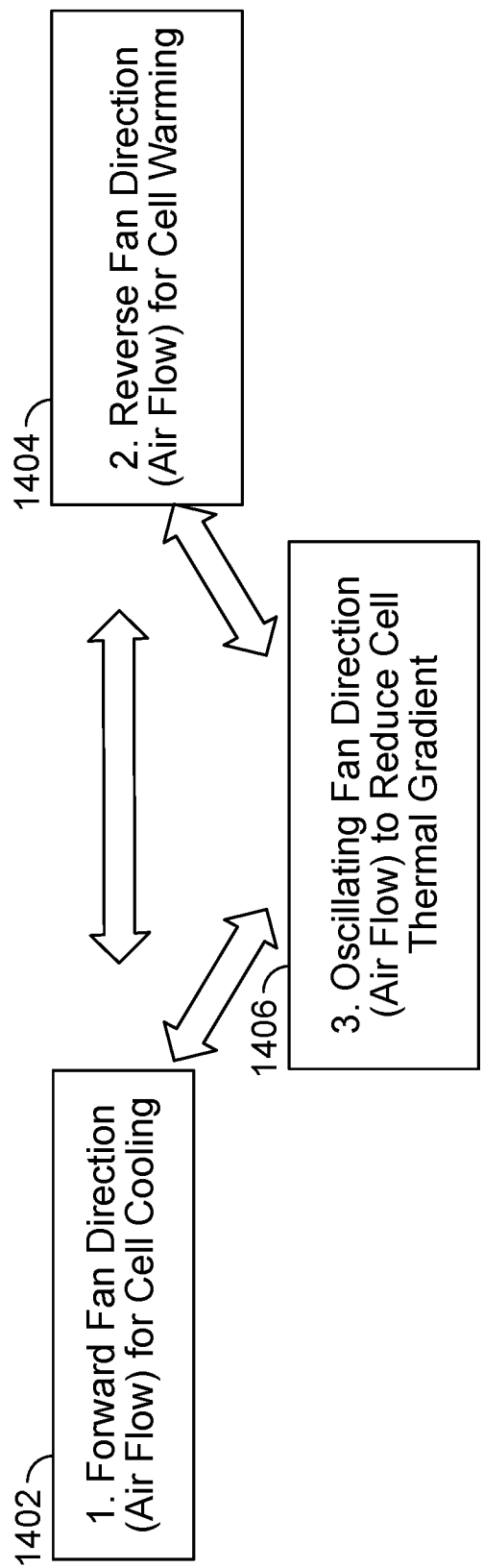
FIG. 14 illustrates an embodiment of bi-directional fan control and logic.

FIG. 14 illustrates an embodiment of bi-directional fan control and logic. In this example, there are three modes (states) of operation. The temperature control system may operate in other modes (states). In some embodiments, each mode further includes one or more sub-modes with different conditions. The following are examples of temperature regulation modes.

State 1 (1402). Forward fan direction (air flow) for cell cooling

State 2 (1404). Reverse fan direction (air flow) for cell warming

State 3 (1406). Oscillating fan direction (air flow) to, for example, reduce cell thermal gradient and improve cell temperature uniformity (delta T). This includes oscillating the fan back and forth intermittently, or continuously In various embodiments, inputs and outputs of the control logic include:
Inputs
  Monitored values—in various embodiments, the temperature control system monitors:
    ambient temperature
    battery cell temperature field
    DC-DC power converter temperature
    battery states, such as state of charge (SOC), state of health (SOC), state of power (SOP), and state of energy (SOE). Battery states that are monitored may also include electrical characteristics such as voltage, resistance, etc.
  $\Delta T$: In some embodiments, the $\Delta T$ is the maximum difference between any two points of the battery cell. In some embodiments, $\Delta T$ is measured using temperature sensors. In other embodiments, $\Delta T$ is predicted according to a model.
  Control targets (e.g., battery lifetime, maximum power density, maximum performance, etc.)
Outputs In various embodiments, the temperature control system modulates:
  Fan control parameters such as fan direction and fan RPM. In some embodiments, the temperature control system outputs instructions to a fan controller for controlling the operation of the fan. As one example, if the fan includes stepper motors, where a set of switches are turned on and off at the appropriate time to cause the fan to move a certain way, then an appropriate control pattern may be transmitted to the fan controller to control the direction and speed of the fan. As another example, for a PWM (pulse-width modulation) fan, the output may be a duty cycle that is provided as input to a fan controller, where the fan controller reads the duty cycle and operates the fan accordingly
  Closed/open loop parameters, such as the opening of baffles, valves, dampers, etc., as will be described in further detail below with respect to transforming a battery block into an open air or closed air loop system.

The following are example triggers for switching between states, depending on system status and control targets:
  1==>2: Energy System state/status: the ambient temperature is below a low ambient temperature threshold. Control target: Heating of the battery should be performed.
  2==>1: Energy System state/status: the ambient temperature is above a high ambient temperature threshold. Control target: The battery should be cooled.
  1==>3 and 2==>3: Energy System state/status: Temperature is moderate, but cell thermal gradient ($\Delta T$) is large. Control Target: Temperature uniformity should be reduced using oscillating air flow.
  3==>1: Energy System state/status: The battery thermal gradient ($\Delta T$) is within limit, but cell should be cooled (control target).
  3==>2: Energy System state/status: Battery thermal gradient ($\Delta T$) is within limit, but cell should be heated (control target).

As shown in the above example logic, there are different control algorithms for different modes of operation.

The use of a bi-directional fan in conjunction with the temperature control logic described above has various benefits. For example, implementation complexity may be minimized, as there are minimal hardware, software, and firmware modifications to be made. Further, there is flexibility in the various modes of operation that are allowed.

In some embodiments, the output is controlled to balance the warming of the batteries with the cooling of the power electronics. For example, having low airflow may be beneficial to keep the batteries at a warm temperature. However, this is less optimal for the DC-DC power converter, which may become hot and need to be cooled (e.g., for reliability purposes). In some embodiments, the temperature of the DC-DC converter is also measured, where the amount of cooling needed may be used to determine the amount of airflow needed. As shown in the above examples, in some embodiments, the direction of the fan may also be based on the outside temperature and the cell temperature.

Closed Air Loop Configuration

In some embodiments, the battery block is implemented such that it can be operated in an open air loop mode or a closed air loop mode. As will be described in further detail below, ducts, dampers, valves, etc. may be used to transform the battery block from an open air loop mode into a closed air loop mode, and vice versa.

The ability to operate the energy storage system (and its battery blocks) in a closed air loop has various benefits. For example, when in heating mode, heat is entrapped in the closed loop and the energy usage is much higher (e.g., —100%), as compared to the "air in & out approach" (e.g., open air mode) where much of the heat may be transferred to the ambient air/environment. Also, the use of a closed air loop system may be beneficial in situations where the DC-DC power converter should be cooled, but the battery should be heated. In some embodiments, a cold battery (with large thermal mass) may be used as a heat sink to cool DC-DC power electronics that are running hot.

The closed air loop system may be combined with a bi-directional fan to modulate air flow direction and flow rate to help cells operate in a desired temperature zone/range or to achieve other temperature control targets/goals. In some embodiments, the direction and speed of the fan, along with whether the battery block is in open air or closed air loop mode (e.g., by control of ducts, valves, dampers, flaps, etc.) is controlled by the temperature control logic described above.

Figure 15A:
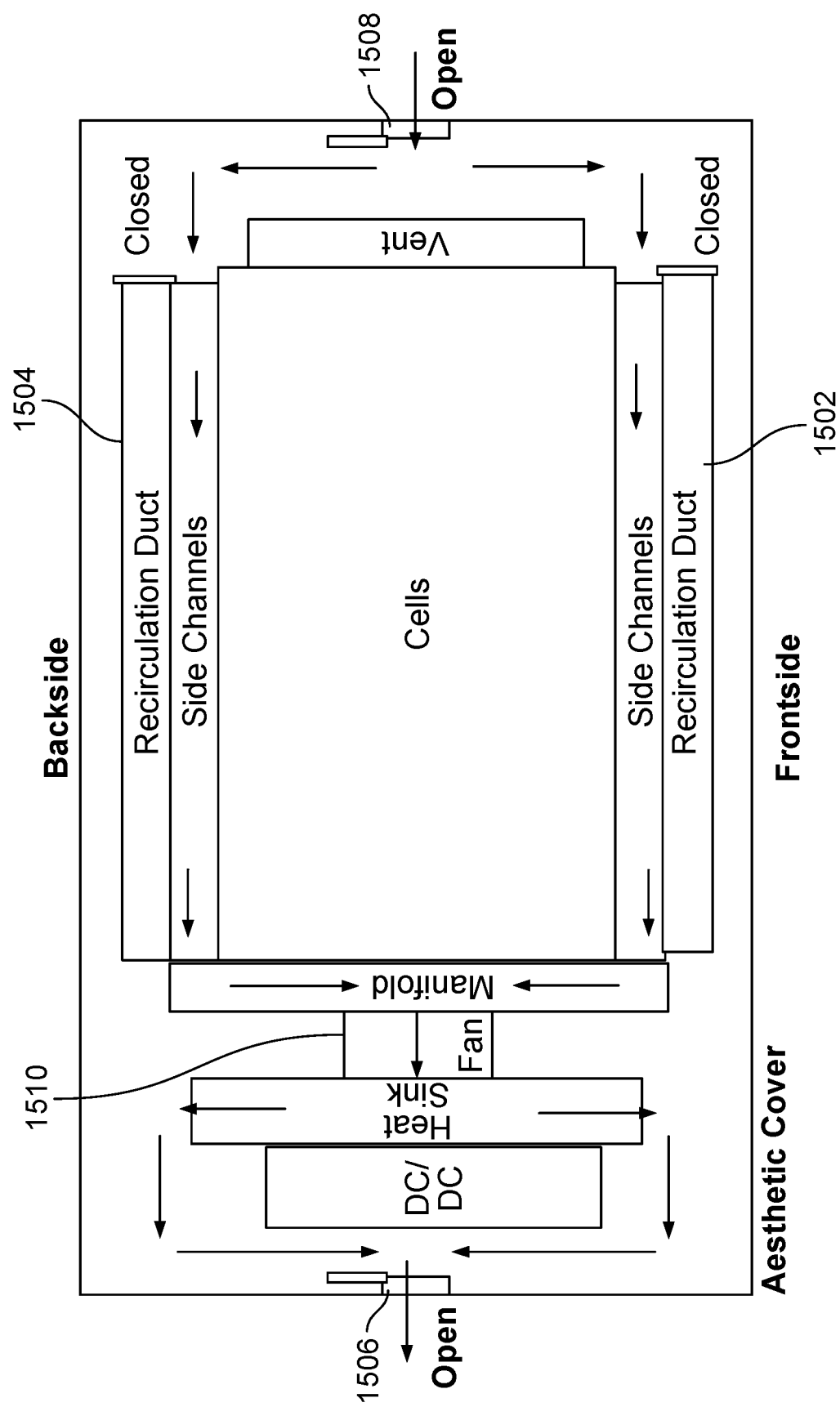
FIG. 15A illustrates an embodiment of an open-air loop operation mode for cooling.
Figure 15B:
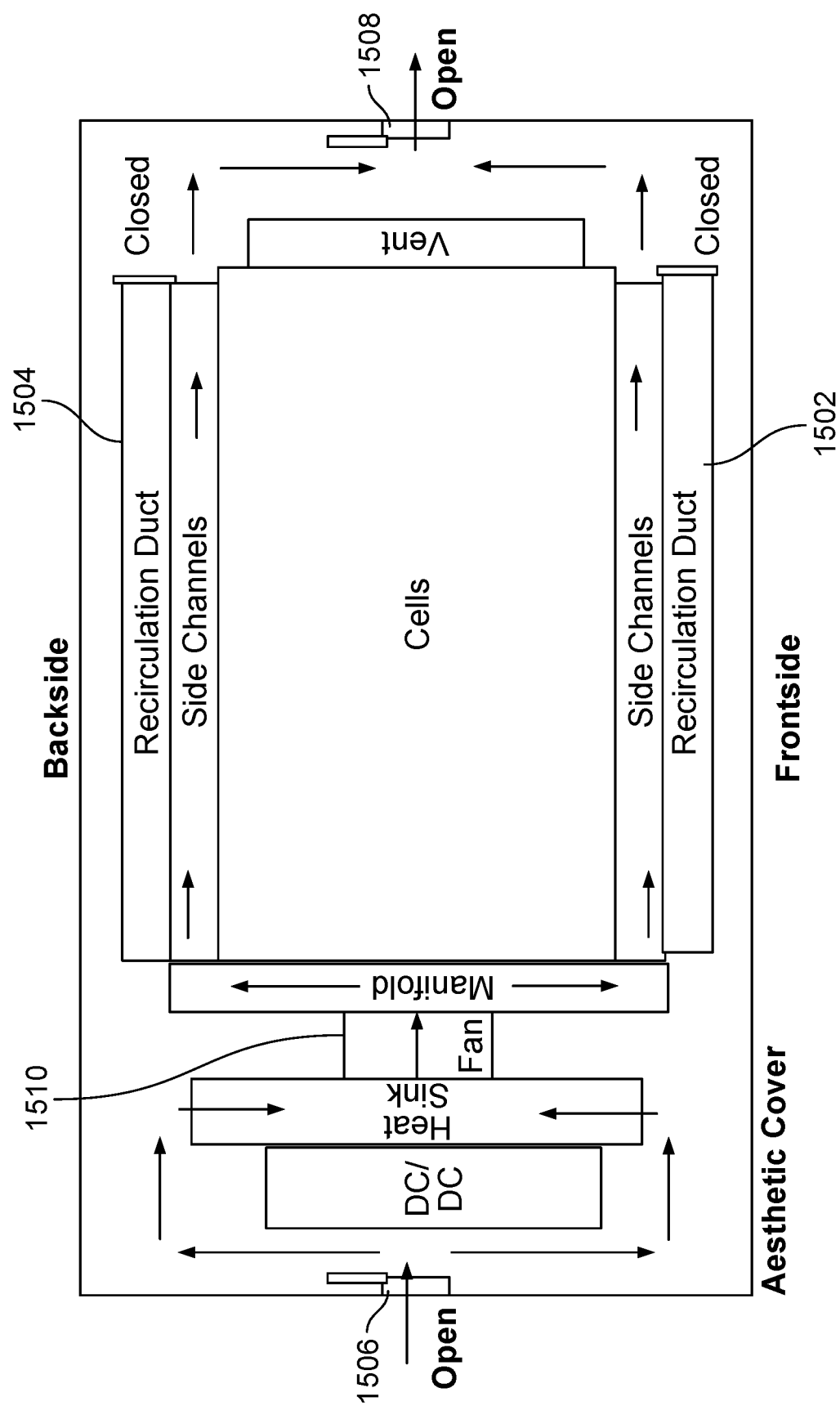
FIG. 15B illustrates an embodiment of an open-air loop operation mode for heating.
Figure 15C:
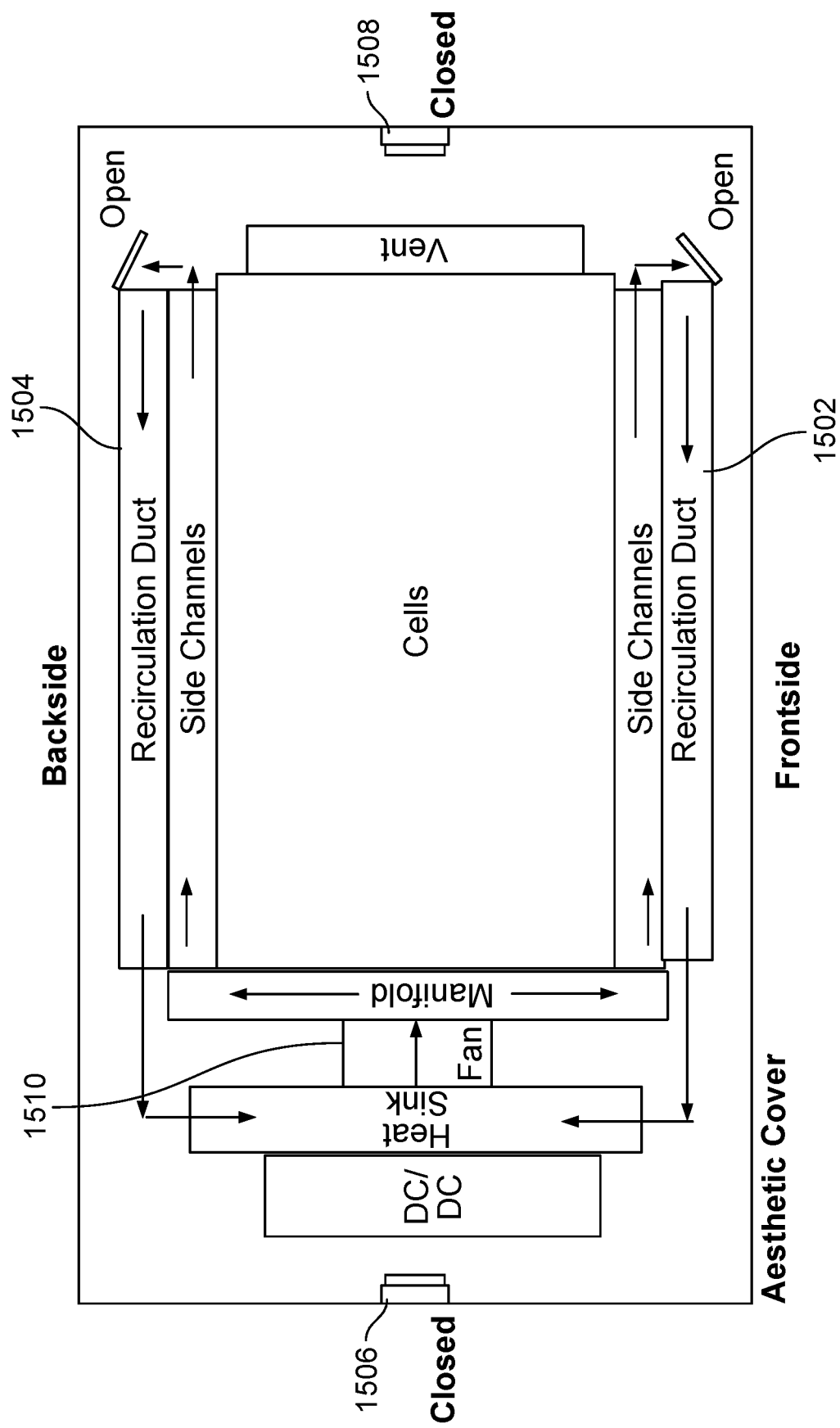
FIG. 15C illustrates an embodiment of a closed-air loop operation mode.

FIGS. 15A-15C illustrate an embodiment of a system that may be operated in either an open-loop mode or a closed-loop mode. In the examples of FIGS. 15A-15C, the battery block includes recirculation ducts and openings that may be opened/closed. This allows for both forward and reverse air flow (when open), as well as a circulation mode of operation (when closed). For example, the battery block includes ducting to connect the outlet and inlet ports together. In the case of recirculation, rather than pulling air from outside, the fan acts as a circulation fan, averaging the temperature inside a battery block by circulating air from the batteries to the electronics. A flap may also be used to close off the inlet/exhaust ports. Further details regarding a closed air loop mode for recirculation are described below in conjunction with FIG. 15C.

FIG. 15A illustrates an embodiment of an open-air loop operation mode for cooling. In this example, a top-down view of a battery block is shown, where the wall on which the block is mounted is at the backside. In this example, the battery block includes frontside recirculation duct 1502, backside recirculation duct 1504, left opening 1506, and right opening 1508.

In this example, the battery block is in an open air loop mode, where openings 1506 and 1508 are opened, and recirculation ducts 1502 and 1504 are closed. In this example of cooling, the fan 1510 operates in the "forward" direction and drives air from right to left. When in this forward direction, the cells are cooled, similar to as described in conjunction with FIG. 4C.

FIG. 15B illustrates an embodiment of an open-air loop operation mode for heating. In this example, the battery block is in an open air loop mode, where openings 1506 and 1508 are opened, and recirculation ducts 1502 and 1504 are closed. In this example, the fan 1510 is run in the "reverse" direction, and drives air from left to right. As described above, when operating in this mode, the cells are heated using heat from a source such as DC-DC power converter waste heat and/or a specific heater.

FIG. 15C illustrates an embodiment of a closed-air loop operation mode. As shown in this example of a closed air loop mode, openings 1506 and 1508 are closed, and recirculation ducts 1502 and 1504 are open. In this way, by closing ports 1506 and 1508, any air flowing in the block does not exit out of the battery block, but is instead recirculated within the battery block. In this example, the fan 1510 pushes air from left to right. The fan is also able to push air from right to left. For example, the air flow in the circulation ducts 1502 and 1504 can be right-to-left or left-to-right depending on the direction that the fan is being run. Thus, in the backside sub air loop (e.g., between the backside side channels and the backside recirculation duct) and the frontside sub air loop (e.g., between the frontside side channels and the frontside recirculation duct), the air flow may be clockwise or counter-clockwise depending on fan direction. In some embodiments, in the closed-loop mode shown, air may be flowed continuously in one direction, or air flow direction may be switched intermittently, for example, by changing fan direction. Switching air flow intermittently may be beneficial to aid in cell temperature uniformity.

A recirculation duct may be implemented as a single duct or multiple smaller ducts. In some embodiments, a recirculation duct is a separate part, or is combined with a side channel (of the battery modules) as a single part or component.

The valves/dampers for the recirculation duct (for opening or closing the recirculation duct to allow air flow through the recirculation duct) may be placed anywhere along the recirculation duct. The valves/dampers may be separate from the duct or integrated as a combined piece.

In some embodiments, the valves/damper openings are independently controllable. This allows for improved control of air flow rate for the front and back branches (which can facilitate achieving improved cell temperature uniformity for front cells versus backside cells, as the front side and backside may have different thermal requirements).

Figure 16A:
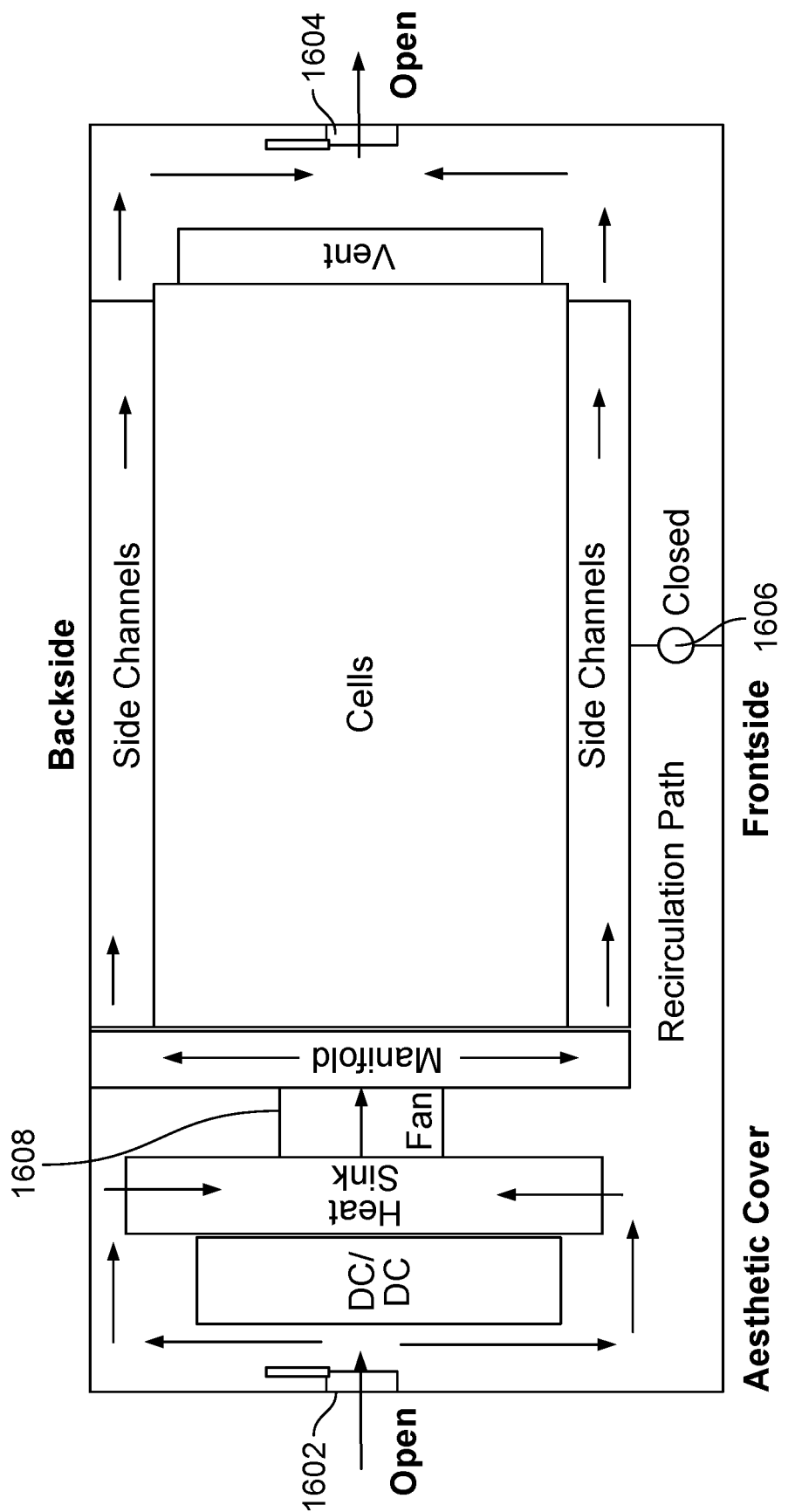
FIG. 16A illustrates an embodiment of an open-loop operation mode.
Figure 16B:
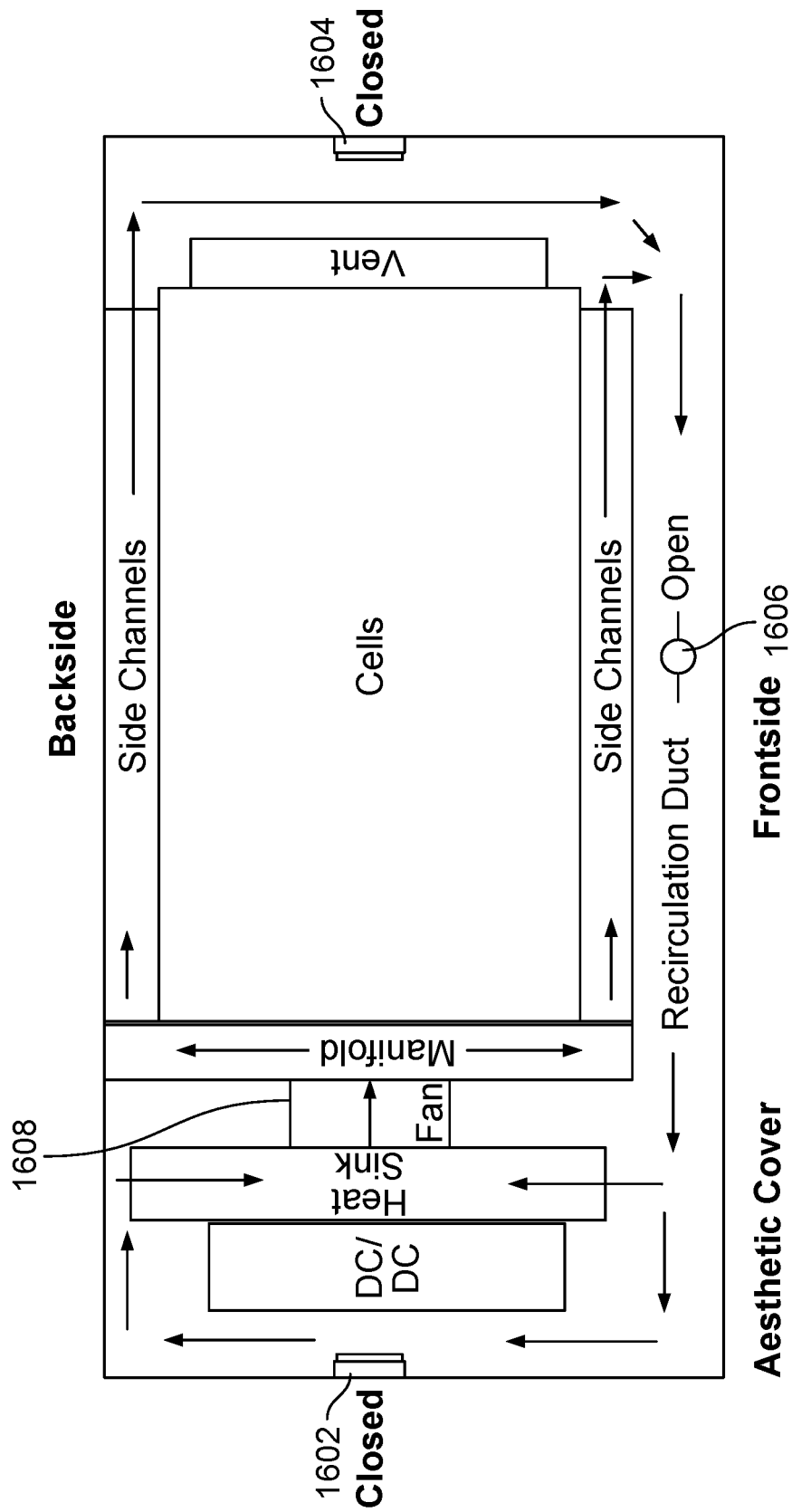
FIG. 16B illustrates an embodiment of a closed-loop operation mode.

FIGS. 16A-16B illustrate an alternative embodiment of a system that may be operated in an open-loop mode or a closed-loop mode. In this example, the battery block uses the aesthetic cover as a recirculation duct wall. There is a single recirculation path in this example. A damper/valve is placed in the recirculation path to open/close the recirculation path.

FIG. 16A illustrates an embodiment of an open-loop operation mode. In this example, (a) the aesthetic cover is used as a recirculation duct wall; (b) in this example, one recirculation path is shown at the frontside; (c) in this example, a damper/value 1606 is inside the circulation path and used to close or open the recirculation path. The fan direction determines whether cell heating or cooling is being performed. In this example, the openings 1602 and 1604 are open, and the damper 1606 is closed, closing the recirculation path. With this open air loop configuration, the cells may be warmed by running the fan 1608 in a direction such as to cause air to be driven from left to right. The cells may be cooled by running the fan 1608 in the opposite direction (with air being driven from right to left).

FIG. 16B illustrates an embodiment of a closed-loop operation mode. In this example, the openings 1602 and 1604 are closed, and the damper/valve 1606 is open (allowing the recirculation path/duct to be open). This allows air to be recirculated within the battery block, making the temperature across the cells more uniform, and reducing the delta T across the battery cells. The fan 1608 may be run in various directions (or run in an oscillating manner) to facilitate circulation of air within the battery block.

The following are further details regarding the temperature control implementations described above in conjunction with FIGS. 15A-15C and 16A-16B. The use of a closed air loop system for cell heating has various benefits, such as higher energy use efficiency than in the open air loop configuration.

In some embodiments, each recirculation duct can be one single duct or multiple smaller ducts. In some embodiments, each recirculation duct may be a standalone part, or combined with a side channel as a single part.

The valves/dampers for each recirculation duct may be put anywhere along the recirculation duct, where the valves/dampers need not be at the inlets or outlets. The valves/dampers may be linear or angular. In various embodiments, the valves/dampers are motor-driven (e.g., linear or rotary motion), passive (e.g., thermostat), or manually operated. In some embodiments, with motor-driven valves/dampers, power-saving measures are implemented, where the motor-driven valves/dampers only consume energy for switching states. For example, power-saving dampers/valves may be used that only consume energy during the opening or closing process, and that do not consume energy to maintain its opened or closed state.

In some embodiments, the valve/damper opening for the front and back recirculation path is independently controllable, as the cells at the front side and the back side may have different thermal requirements (e.g., different ambient temperatures, wind speed, heat loss rate, etc.).

In some embodiments, each valve/damper is standalone. In other embodiments, multiple valves/dampers may be combined as one integrated valve/damper.

In some embodiments, the same dampers/valves in different blocks (that are at the same location within each block) are connected together so that they can be opened/closed simultaneously (e.g., controlled as a group by the temperature control logic described above). In some embodiments, the individual valves/dampers within each battery block are connected together so that they can be opened/closed together. In other embodiments, each damper/valve is independently controllable.

As shown in the above examples, in some embodiments, the aesthetic cover serves as a recirculation duct wall (similar to the gas tank in an airplane wing, in which the wing skin serves as the gas tank wall).

In the above examples of FIGS. 15A-15C, the battery block includes two recirculation ducts (both front side and back side). In other embodiments, there is a single recirculation duct (e.g., as shown in the example of FIG. 16B). In some embodiments, the space between battery blocks may also be used as a recirculation duct passage.

In some embodiments, in an open air loop flow design (e.g., without recirculation ducts), two dampers are included in the battery block, one at the main inlet and one at the main outlet, to avoid cold air entering the battery block in cold and windy weather.

The closed-loop air flow battery block designs described above may be used in conjunction with a bi-directional fan as described above, or may be used independently of each other.

Bus-Bar Heating

The following are additional embodiments of techniques for heating battery cells. As described above, in some embodiments, the battery block includes bus bars used to connect the various battery modules together. In one embodiment, the cells are heated by heating the busbars connected to the tabs on each battery cell, where heat is conducted through the tabs, directly into the cells. In some embodiments, the battery cells are heated from one end. In other embodiments, in order to reduce the temperature gradient across the battery cells, the heating is performed slowly. In another embodiment, the battery modules are adapted to facilitate two sided heating. This reduces the delta T across the battery cell.

As described above, the battery cell cooling/heating techniques described herein are implemented on a per-battery block level. That is, the temperature regulation of the battery blocks may be controlled independently and separately from each other. In this way, the temperature of each of the battery blocks may be controlled individually, for example, with different flow rates. This provides various benefits, as the energy storage system is scalable and easy to control at a granular level (where the heating/cooling is also scalable).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An energy storage assembly, comprising:
a vertical stack of substantially planar modules, each module comprising:
 a plurality of energy storage components; and
 a thermally conductive shell comprising a shell top, a shell bottom, shell sides, a shell front, and a shell rear,
 wherein a thermal management solution comprising a thermally absorptive material is located between two vertically adjacent modules; and
a forced air system that causes air to flow along at least one of the shell's sides such that heat is transferred from the energy storage components to a heat sink during normal operation of the energy storage assembly,
wherein the forced air system comprises a fan,
wherein the fan is located between the heat sink and the plurality of energy storage components,
wherein the heat sink is located between a DC-DC power converter and the fan, wherein:
 the fan causes the air to flow along the at least one of the shell sides, wherein the air is split around the plurality of energy storage components into a first portion and a second portion, wherein the first portion of the air goes along a first side of the plurality of energy storage components, wherein the second portion of the air goes along a second side of the plurality of energy storage components, wherein the first side is different from the second side, and wherein after passing the plurality of energy storage components, the first and second portions of air both flow into a duct and merge when going through the fan;
 in the event that an ambient temperature is greater than or equal to a high ambient temperature threshold, setting the fan in a forward fan direction to cool the energy storage assembly, the forward fan direction relating to drawing ambient air from outside of the plurality of energy storage components across the plurality of energy storage components to absorb heat from the plurality of energy storage components;
 in the event that the ambient temperature is less than or equal to a low ambient temperature threshold, setting the fan in a reverse fan direction to warm the energy storage assembly, the reverse fan direction relating to driving air from the DC-DC power converter passing over the plurality of energy storage components to the outside to cool to heat the plurality of energy storage components; and in the event that a cell thermal gradient is greater than or equal to a cell thermal gradient threshold, setting the fan in an oscillating direction to increase cell temperature uniformity of the plurality of energy storage components.

2. The energy storage assembly of claim 1, wherein the plurality of energy storage components comprises an inner set of battery pouches.

3. The energy storage assembly of claim 1, further comprising a top insulating layer above the plurality of energy storage components.

4. The energy storage assembly of claim 1, further comprising a bottom insulating layer below the plurality of energy storage components.

5. The energy storage assembly of claim 1, wherein the thermally conductive shell is sealed.

6. The energy storage of claim 1, further comprising a rear region inside the shell in communication with a rear blow-out valve.

7. The energy storage assembly of claim 6, wherein the rear blow-out valve is in communication with a common exhaust diffuser.

8. The energy storage assembly of claim 7, wherein the rear blow-out valve is in communication with the common exhaust diffuser via a sealed passageway.

9. The energy storage assembly of claim 1, wherein the shell top comprises a geometry for locating the thermal management solution.

10. The energy storage assembly of claim 9, wherein the shell top includes an indentation for locating the thermal management solution.

11. The energy storage assembly of claim 1, wherein the thermally absorptive material comprises one of a phase change material or a vaporizing liquid.

12. The energy storage assembly of claim 1, wherein the energy storage assembly is surrounded by a vented shield.

13. The energy storage assembly of claim 1, wherein the modules are in communication with the ambient air.

14. The energy storage assembly of claim 1, wherein each module further comprises a divider.

15. The energy storage assembly of claim 14, wherein the divider partitions a module into two sub-modules.

16. The energy storage assembly of claim 14, wherein the divider comprises an interior wall.

17. The energy storage assembly of claim 1, further comprising two frames extending along a front and a rear of the modules.

18. The energy storage assembly of claim 17, wherein a frame of the two frames includes a hook adapted to hang the energy storage assembly from a wall-mounted bracket.

19. The energy storage assembly of claim 17, wherein the two frames support the modules.

20. The energy storage assembly of claim 1, wherein each module further comprises a DC-DC converter.

21. The energy storage assembly of claim 1, further comprising an electrical port, wherein the energy storage assembly is connected to a second battery assembly via a wiring harness, and wherein the wiring harness comprises a connector for plugging into the electrical port of the energy storage assembly.

22. The energy storage assembly of claim 21, wherein the energy storage assembly is connected to an inverter via the wiring harness.

23. The energy storage assembly of claim 1, wherein each module further comprises a sensor port.

* * * * *